(12) United States Patent
Matsumoto et al.

(10) Patent No.: US 8,514,963 B2
(45) Date of Patent: Aug. 20, 2013

(54) DATA TRANSMISSION DEVICE, DATA RECEPTION DEVICE, AND WIRELESS COMMUNICATIONS SYSTEM

(75) Inventors: Wataru Matsumoto, Tokyo (JP); Shigeru Uchida, Tokyo (JP); Toshiyuki Kuze, Tokyo (JP); Hideo Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 420 days.

(21) Appl. No.: 12/810,638

(22) PCT Filed: Dec. 25, 2008

(86) PCT No.: PCT/JP2008/003970
§ 371 (c)(1),
(2), (4) Date: Jul. 13, 2010

(87) PCT Pub. No.: WO2009/084207
PCT Pub. Date: Jul. 9, 2009

(65) Prior Publication Data
US 2010/0272202 A1    Oct. 28, 2010

(30) Foreign Application Priority Data
Dec. 28, 2007    (JP) .................................. 2007-339716

(51) Int. Cl.
*H04B 7/02*    (2006.01)
(52) U.S. Cl.
USPC ....................................................... 375/267
(58) Field of Classification Search
USPC .......................... 375/267, 299; 370/328, 442
See application file for complete search history.

(56) References Cited

U.S. PATENT DOCUMENTS

| | | | |
|---|---|---|---|
| 2002/0046379 A1 | 4/2002 | Miki et al. | |
| 2003/0012195 A1* | 1/2003 | Ohkubo et al. | 370/390 |
| 2003/0223452 A1* | 12/2003 | Toskala et al. | 370/442 |
| 2005/0031050 A1* | 2/2005 | Kim et al. | 375/267 |
| 2005/0063330 A1* | 3/2005 | Lee et al. | 370/328 |
| 2006/0114813 A1* | 6/2006 | Seki et al. | 370/208 |

(Continued)

FOREIGN PATENT DOCUMENTS

| | | |
|---|---|---|
| JP | 6-46037 A | 2/1994 |
| JP | 2002-974 A | 1/2002 |

(Continued)

OTHER PUBLICATIONS

IEEE Standard for Local and metropolitan area networks, "Part 16: Air Interface for Fixed and Mobile Broadband Wireless Access Systems", Amendment 2 and Corrigendum 1 to IEEE Std. 802.16-2004, pp. 614-615.

Zhang et al., "Proposed Text Modification in Section 4.7: PHY Abstraction for H-ARQ", IEEE C802.16m-07/189, Sep. 10, 2007, pp. 1-5.

*Primary Examiner* — Jaison Joseph
(74) *Attorney, Agent, or Firm* — Birch, Stewart, Kolasch & Birch, LLP

(57) ABSTRACT

When an error correction decoding unit 26 of a data reception device 2 fails in error correction decoding of a codeword, an MIMO processing unit 15 of a data transmission device 1 deforms transmitted codewords according to a predetermined rule, and transmits the codewords, and the error correction decoding unit 26 of the data reception device 2 reproduces data by using the deformed codewords. As a result, not only the noise but the interference wave components can be reduced, and the success rates of the demodulation and error correction decoding can be improved greatly.

13 Claims, 3 Drawing Sheets

(56) References Cited

U.S. PATENT DOCUMENTS

| | | | |
|---|---|---|---|
| 2007/0110064 A1* | 5/2007 | Ohkubo et al. | 370/390 |
| 2007/0127592 A1* | 6/2007 | Lee et al. | 375/299 |
| 2009/0042519 A1* | 2/2009 | Sudo | 455/101 |
| 2010/0138715 A1* | 6/2010 | Motoyoshi | 714/749 |

FOREIGN PATENT DOCUMENTS

| | | |
|---|---|---|
| JP | 2007-312156 A | 11/2007 |
| WO | WO 2005/004376 A1 | 1/2005 |
| WO | WO 2006/013630 A1 | 2/2006 |
| WO | WO 2007/088579 A1 | 8/2007 |

* cited by examiner (i) At Time of First-Time Transmission (ii) At Time of Retransmission (Two Retransmissions)

DATA TRANSMISSION DEVICE, DATA RECEPTION DEVICE, AND WIRELESS COMMUNICATIONS SYSTEM

FIELD OF THE INVENTION

The present invention relates to a data transmission device that transmits a plurality of codewords simultaneously by using a plurality of antennas, a data reception device that receives a plurality of codewords simultaneously by using a plurality of antennas, and a wireless communications system consisting of the data transmission device and the data reception device.

BACKGROUND OF THE INVENTION

For example, a related art wireless communications system currently disclosed by following nonpatent reference 1 is comprised of the following components.
(1) A Data Transmission Device
  an error correction encoding unit for carrying out error correction encoding of data which is a transmission object to create a codeword
  a modulating unit for modulating the codeword created by the error correction encoding unit by using QPSK or the like.
  an S/P conversion unit for carrying out serial parallel conversion of the codeword modulated by the modulating unit, and for dividing the codeword into codewords.
  an inverse discrete Fourier transform unit for carrying out IDFT (inverse discrete Fourier transform) of the codewords obtained by the S/P conversion unit in the case of OFDM modulation.
  an MIMO processing unit for simultaneously transmitting the codewords on which the IDFT is performed by the inverse discrete Fourier transform unit by using a plurality of transmitting antennas (the MIMO processing unit includes up conversion from a baseband to a high frequency band).
(2) A Data Reception Device
  an MIMO processing unit for receiving the plurality of codewords simultaneously transmitted from the data transmission device by using a plurality of receiving antennas (the MIMO processing unit includes down conversion from a high frequency band to a baseband).
  a discrete Fourier transform unit for carrying out DFT (discrete Fourier transform) of the codewords received by the MIMO processing unit in the case of OFDM modulation.
  a P/S conversion unit for carrying out parallel serial conversion of the codewords on which the DFT is performed by the discrete Fourier transform unit, and for unifying the plurality of codewords into a codeword.
  a demodulating unit for demodulating the codeword into which the plurality of codewords are unified by the P/S conversion unit.
  an error correction decoding unit for carrying out error correction decoding of the codeword demodulated by the demodulating unit to reproduce the data.

In the case in which the MIMO processing unit of the data transmission device transmits a plurality of codewords simultaneously by using the plurality of antennas, an improvement in the transfer rate of the data, etc. can be provided. However, there is a case in which interference occurs among the plurality of communication channels.

Hereafter, a case in which a plurality of codewords are transmitted by way of three communication channels and interference occurs among the three communication channels will be explained.

First, a communication channel response matrix H is assumed as follows.

$$H = \begin{bmatrix} h_{1,1} & h_{1,2} & h_{1,3} \\ h_{2,1} & h_{2,2} & h_{2,3} \\ h_{3,1} & h_{3,2} & h_{3,3} \end{bmatrix} \quad \text{[Equation 1]}$$

where $h_{i,j}$ is a communication channel response from j-th transmitting antenna to i-th receiving antenna.

Furthermore, the symbols of the codewords transmitted from the MIMO processing unit of the data transmission device (symbols which are obtained by modulating an error correcting code expressed by two elements) are expressed as S. For the sake of simplicity, it is assumed that no OFDM modulation is carried out in this example.

$$S = \begin{bmatrix} S_1 \\ S_2 \\ S_3 \end{bmatrix} \quad \text{[Equation 2]}$$

When the MIMO processing unit of the data transmission device transmits the symbol S of the codewords by using the three transmitting antennas, the MIMO processing unit of the data reception device receives a symbol of codewords by using the three receiving antennas. When the received signal is expressed as r, the received signal r is shown as follows.

$$r = HS + n = \begin{bmatrix} h_{1,1}S_1 + h_{1,2}S_2 + h_{1,3}S_3 \\ h_{2,1}S_1 + h_{2,2}S_2 + h_{2,3}S_3 \\ h_{3,1}S_1 + h_{3,2}S_2 + h_{3,3}S_3 \end{bmatrix} + \begin{bmatrix} n_1 \\ n_2 \\ n_3 \end{bmatrix} \quad \text{[Equation 3]}$$

$$\text{where } n = \begin{bmatrix} n_1 \\ n_2 \\ n_3 \end{bmatrix}$$

is a sequence consisting of noise components of receiving antennas.

In this case, when demodulating $S_1$, $S_2$, and $S_3$ which construct the symbol S of the codewords from the received signal received by the receiving antennas 1, 2, and 3, the receiving point of the receiving antenna 1 expressed on the complex plane is shown in FIG. 3(i) at the time of the first-time transmission of the symbol S (according to a simple decoding method, both interference and noise are assumed to be degradation components).

At this time, the received signal is shown as follows.

$$(h_{1,1}S_1 + h_{1,2}S_2 + h_{1,3}S_3 + n_1)h_{1,1}^* = S_1 + h_{1,2}h_{1,1}^*S_2 + h_{1,3}h_{1,1}^*S_3 + h_{1,1}^*n_1 \quad \text{[Equation 4]}$$

where $h_{1,1}h_{1,1}*=1$, and $h_{1,2}h_{1,1}*S_2+h_{1,3}h_{1,1}*S_3+h_{1,1}*n_1$ is all noise components at time of demodulation.

The data transmission device has a mechanism of implementing HARQ-CC (Hybrid Auto-Repeat reQuest-Chase Combining) as a mechanism of, when the data reception device fails to receive the symbol S, automatically retransmitting the same symbol S again.

When the same symbol S is retransmitted thereto, the data reception device adds the symbol S to that received at the time of the first-time transmission to calculate the average, thereby reducing the energy of the noise on average by 3 dB to raise the success rates of the demodulation and error correction decoding.

However, as shown in FIG. 3(ii), because interference wave components including $h_{1,2}h_{1,1}*S_2+h_{1,3}h_{1,1}*S_3$ remain without being reduced, there are few improvements in the performance (according to the conventional method, only the noise becomes small because of HARQ-CC).

[Nonpatent reference 1] IEEE C802.16m-07/189

DESCRIPTION OF THE INVENTION

Because the conventional wireless communications system is constructed as mentioned above, and the data transmission device is provided with the mechanism of, when the data reception device fails in the reception of the symbol S, retransmitting the same symbol S automatically, the energy of the noise can be reduced on average by 3 dB. However, because the interference wave components cannot be removed, there is a problem that the success rates of the demodulation and error correction decoding cannot be improved greatly.

The present invention is made in order to solve the above-mentioned problem, and it is therefore an object of the present invention to provide a data transmission device, a data reception device, and a wireless communications system which can reduce not only noise but interference wave components, and which can improve the success rates of demodulation and error correction decoding greatly.

In a wireless communications system in accordance with the present invention, when an error correction decoding means of a data reception device fails in error correction decoding of a codeword, a codeword transmitting means of a data transmission device deforms transmitted codewords according to a predetermined rule, and transmits the codewords, and the error correction decoding means of the data reception device reproduces data by using the deformed codewords.

According to the present invention, the codeword transmitting means of the data transmission device is configured in such a way as to, when the error correction decoding means of the data reception device fails in the error correction decoding of a codeword, deform transmitted codewords according to the predetermined rule, and transmit the codewords, and the error correction decoding means of the data reception device is configured in such a way as to reproduce data by using the deformed codewords. As a result, there is provided an advantage of being able to reduce not only the noise but the interference wave components, and to improve the success rates of the demodulation and error correction decoding greatly.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
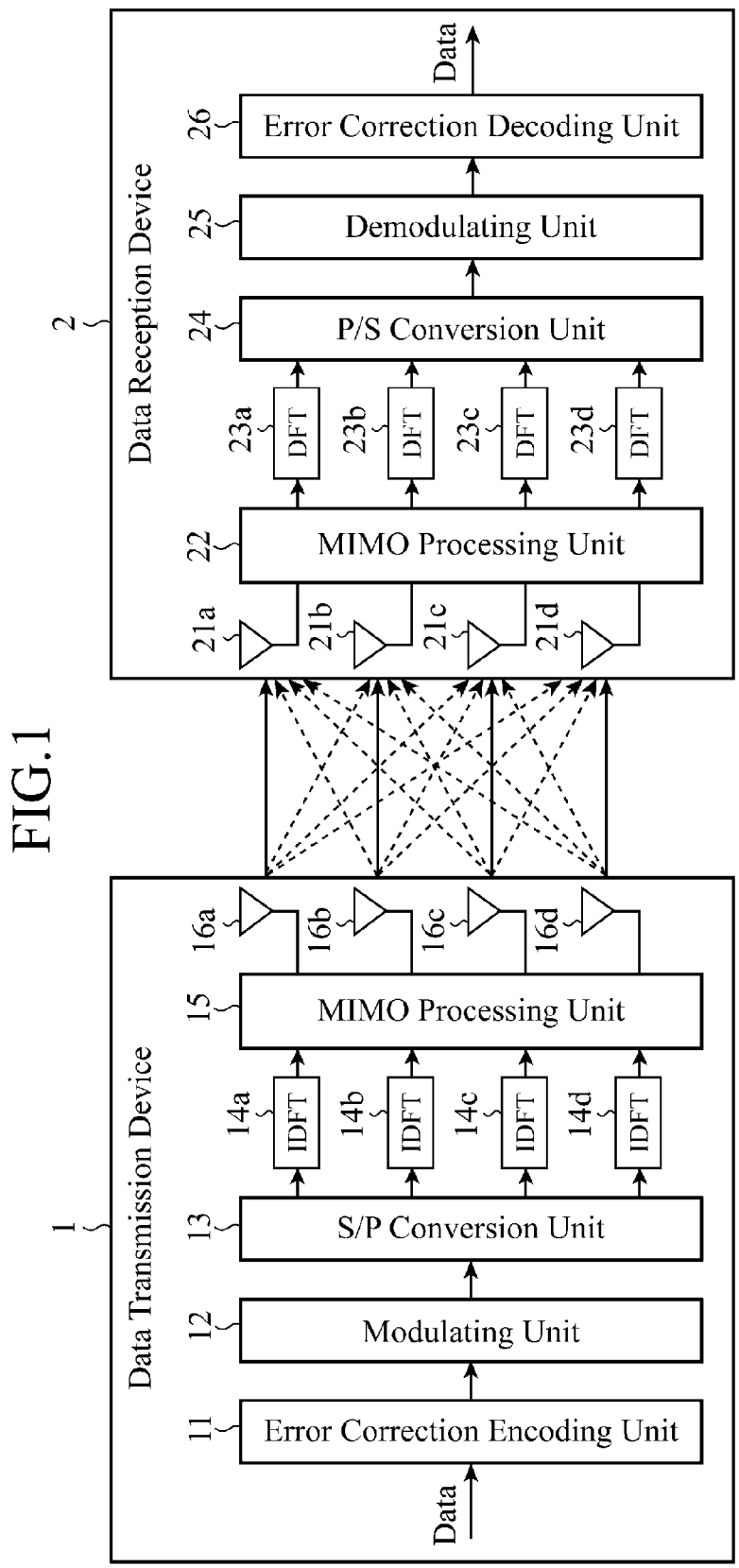
FIG. 1 is a block diagram showing a wireless communications system in accordance with Embodiment 1 of the present invention.

FIG. 1 is a block diagram showing a wireless communications system in accordance with Embodiment 1 of the present invention. In the figure, a data transmission device 1 is a transmitter that transmits a plurality of codewords simultaneously by using a plurality of antennas.

A data reception device 2 is a receiver that receives the plurality of codewords simultaneously by using a plurality of antennas.

An error correction encoding unit 11 of the data transmission device 1 carries out a process of performing error correction encoding of data which is a transmission object to create a codeword. The error correction encoding unit 11 constructs an error correction encoding means.

A modulating unit 12 of the data transmission device 1 carries out a process of modulating the codeword created by the error correction encoding unit 11 by using QPSK or the like. The modulating unit 12 constructs a modulating means.

An S/P conversion unit 13 of the data transmission device 1 carries out a process of performing serial parallel conversion of the codeword modulated by the modulating unit 12, and dividing the codeword into codewords.

Inverse discrete Fourier transform units 14a, 14b, 14c, and 14d of the data transmission device 1 perform IDFT (inverse discrete Fourier transform) on the codewords divided by the S/P conversion unit 13 in the case of OFDM modulation.

An MIMO processing unit 15 of the data transmission device 1 carries out a process of simultaneously transmitting the codewords on which the IDFT is performed by the inverse discrete Fourier transform units 14a, 14b, 14c, and 14d by using transmitting antennas 16a, 16b, 16c, and 16d. The MIMO processing unit 15 also carries out up conversion from a baseband to a high frequency band.

The MIMO processing unit 15 is further provided with a mechanism of implementing HARQ-CC (Hybrid Auto-Repeat reQuest-Chase Combining), and carries out a process of, when an error correction decoding unit 26 of the data reception device 2 fails in error correction decoding of the codewords, deforming the codewords transmitted to the data reception device according to a predetermined rule and transmitting the deformed codewords.

A codeword transmitting means is comprised of the S/P conversion unit 13, the inverse discrete Fourier transform units 14a, 14b, 14c and 14d, and the MIMO processing unit 15.

An MIMO processing unit 22 of the data reception device 2 carries out a process of receiving the plurality of codewords simultaneously transmitted from the data transmission device 1 by using receiving antennas 21a, 21b, 21c, and 21d. The MIMO processing unit 22 also carries out down conversion from a high frequency band to a baseband.

The MIMO processing unit 22 constructs a codeword receiving means.

Discrete Fourier transform units 23a, 23b, 23c, and 23d of the data reception device 2 perform DFT (discrete Fourier transform) on the codewords received by the MIMO processing unit 22 in the case of OFDM modulation.

A P/S conversion unit 24 of the data reception device 2 carries out a process of performing parallel serial conversion on the codewords on which the DFT is performed by the discrete Fourier transform units 23a, 23b, 23c and 23d, and unifying the plurality of codewords into a codeword.

A demodulating unit 25 of the data reception device 2 carries out a process of demodulating the codeword into which the plurality of codewords are unified by the P/S conversion unit 24.

A demodulating means is comprised of the discrete Fourier transform units 23a, 23b, 23c and 23d, the P/S conversion unit 24, and the demodulating unit 25.

The error correction decoding unit 26 of the data reception device 2 carries out a process of performing error correction decoding on the codeword demodulated by the demodulating unit 25 to reproduce the data.

The error correction decoding unit 26 also carries out a process of, when the codewords deformed using HARQ-CC is transmitted from the data transmission device 1, reproducing the data by using the deformed codewords.

The error correction decoding unit 26 constructs an error correction decoding means.

Next, the operation of the system will be explained.

When receiving data which is a transmission object, the error correction encoding unit 11 of the data transmission device 1 carries out error correction encoding of the data to create a codeword.

After the error correction encoding unit 11 creates the codeword, the modulating unit 12 of the data transmission device 1 modulates the codeword by using QPSK or the like.

After the modulating unit 12 modulates the codeword, the S/P conversion unit 13 of the data transmission device 1 carries out serial parallel conversion of the codeword and divides the codeword into codewords.

In the example of FIG. 1, the S/P conversion unit divides the codeword into four codewords, and outputs the four divided codewords to the inverse discrete Fourier transform units 14a, 14b, 14c, and 14d respectively.

In the case of OFDM modulation, the inverse discrete Fourier transform units 14a, 14b, 14c, and 14d of the data transmission device 1 perform IDFT on the codewords into which the codeword is divided by the S/P conversion unit 13 respectively.

The MIMO processing unit 15 of the data transmission device 1 simultaneously transmits the codewords on which the IDFT is performed by the inverse discrete Fourier transform units 14a, 14b, 14c, and 14d by using the transmitting antennas 16a, 16b, 16c, and 16d respectively.

When the data transmission device 1 transmits the plurality of codewords simultaneously, the MIMO processing unit 22 of the data reception device 2 receives the plurality of codewords transmitted from the data transmission device 1 by using the receiving antennas 21a, 21b, 21c, and 21d.

In the case of OFDM modulation, the discrete Fourier transform units 23a, 23b, 23c, and 23d of the data reception device 2 perform DFT on the codewords received by the MIMO processing unit 22 respectively.

The P/S conversion unit 24 of the data reception device 2 carries out parallel serial conversion of the codewords on which the DFT is performed by the discrete Fourier transform units 23a, 23b, 23c, and 23d, and unifies the plurality of codewords into a codeword.

After the P/S conversion unit 24 unifies the codewords into a codeword, the demodulating unit 25 of the data reception device 2 demodulates the codeword into which the plurality of codewords are unified.

After the demodulating unit 25 demodulates the codeword, the error correction decoding unit 26 of the data reception device 2 carries out error correction decoding of the codeword to reproduce the data.

When the error correction decoding unit 26 of the data reception device 2 has succeeded in the error correction decoding of the codeword, the data outputted from the error correction decoding unit 26 are correct, though in the case in which the plurality of codewords are transmitted via the four communication channels, interference may occur among the four communication channels, and, in this case, the error correction decoding unit 26 may fail in the error correction decoding of the codeword.

When the error correction decoding unit 26 of the data reception device 2 fails in the error correction decoding of the codeword, the MIMO processing unit 15 of the data transmission device 1 deforms the codewords transmitted to the data reception device according to the predetermined rule, and then transmits the deformed codewords.

When the codewords deformed using HARQ-CC from the data transmission device 1 are transmitted to the data reception device 2, the error correction decoding unit 26 of the data reception device 2 reproduces the data by using the deformed codewords.

Hereafter, a case in which the codewords deformed using HARQ-CC are transmitted from the data transmission device 1 will be explained in detail.

For convenience in description, it is assumed that the codewords are transmitted via the three communication channels and interference occurs among the three communication channels.

First, the communication channel response matrix H is assumed as follows.

[Equation 5]

$$H = \begin{bmatrix} h_{1,1} & h_{1,2} & h_{1,3} \\ h_{2,1} & h_{2,2} & h_{2,3} \\ h_{3,1} & h_{3,2} & h_{3,3} \end{bmatrix} \quad (21)$$

where $h_{i,j}$ is a communication channel response from j-th transmitting antenna to i-th receiving antenna.

Furthermore, the symbols of the codewords transmitted from the MIMO processing unit 15 of the data transmission device 1 (symbols which are obtained by modulating an error correcting code expressed by two elements) are expressed as S. For the sake of simplicity, it is assumed that no OFDM modulation is carried out in this example.

[Equation 6]

$$S = \begin{bmatrix} S_1 \\ S_2 \\ S_3 \end{bmatrix} \quad (22)$$

When the MIMO processing unit 15 of the data transmission device 1 transmits the symbols S of the codewords by using the three transmitting antennas 16a, 16b, and 16c, the MIMO processing unit 22 of the data reception device 2 receives the symbols of codewords by using the three receiving antennas 21a, 21b, and 21c. When the received signal is expressed as r, the received signal r is shown as follows.

[Equation 7]

$$r = HS + n = \begin{bmatrix} h_{1,1}S_1 + h_{1,2}S_2 + h_{1,3}S_3 \\ h_{2,1}S_1 + h_{2,2}S_2 + h_{2,3}S_3 \\ h_{3,1}S_1 + h_{3,2}S_2 + h_{3,3}S_3 \end{bmatrix} + \begin{bmatrix} n_1 \\ n_2 \\ n_3 \end{bmatrix} \quad (23)$$

where $n = \begin{bmatrix} n_1 \\ n_2 \\ n_3 \end{bmatrix}$ is a sequence consisting of noise components of receiving antennas.

When the symbols $S^{(1)}$ of the codewords which are transmitted for the first time (at the time of the first-time transmission) are not decoded normally by the error correction decoding unit 26 of the data reception device 2, the MIMO processing unit 15 of the data transmission device 1 multiplies the symbols $S^{(1)}$ by a part of an orthogonal code to deform the symbols $S^{(1)}$ into symbols $S^{(2)}$. The MIMO processing unit also multiplies the symbols $S^{(1)}$ by a part of the orthogonal code to deform the symbols $S^{(1)}$ into symbols $S^{(3)}$.

After creating the symbols $S^{(2)}$ and $S^{(3)}$ in the above-mentioned way, the MIMO processing unit 15 of the data transmission device 1 transmits the symbols $S^{(2)}$ and $S^{(3)}$ by using the three transmitting antennas 16a, 16b, and 16c after transmitting the symbols $S^{(1)}$.

[Equation 8]

$$S^{(1)} = \begin{bmatrix} S_1 \\ S_2 \\ S_3 \end{bmatrix}, \ S^{(2)} = \begin{bmatrix} S_1 \\ e^{-j2\pi\frac{1}{3}} \cdot S_2 \\ e^{-j2\pi\frac{2}{3}} \cdot S_3 \end{bmatrix}, \ S^{(3)} = \begin{bmatrix} S_1 \\ e^{-j2\pi\frac{2}{3}} \cdot S_2 \\ e^{-j2\pi\frac{1}{3}} \cdot S_3 \end{bmatrix} \quad (24)$$

After the MIMO processing unit 15 of the data transmission device 1 transmits the sequence $S^{(1,2,3)}$ of the symbols $S^{(1)}$, $S^{(2)}$, and $S^{(3)}$, the MIMO processing unit 22 of the data reception device 2 receives a sequence $r^{(1,2,3)}$ of symbols by using the three receiving antennas 21a, 21b, and 21c. This sequence $r^{(1,2,3)}$ is shown as follows.

[Equation 9]

$$r^{(1,2,3)} = H[S^{(1)} \ S^{(2)} \ S^{(3)}] + n^{(1,2,3)} = \begin{bmatrix} h_{1,1} & h_{1,2} & h_{1,3} \\ h_{2,1} & h_{2,2} & h_{2,3} \\ h_{3,1} & h_{3,2} & h_{3,3} \end{bmatrix} \begin{bmatrix} S_1 & S_1 & S_1 \\ S_2 & e^{-j2\pi\frac{1}{3}} \cdot S_2 & e^{-j2\pi\frac{2}{3}} \cdot S_2 \\ S_3 & e^{-j2\pi\frac{2}{3}} \cdot S_3 & e^{-j2\pi\frac{1}{3}} \cdot S_3 \end{bmatrix} + \begin{bmatrix} n_1^{(1)} & n_1^{(2)} & n_1^{(3)} \\ n_2^{(1)} & n_2^{(2)} & n_2^{(3)} \\ n_3^{(1)} & n_3^{(2)} & n_3^{(3)} \end{bmatrix} = \quad (25)$$

$$\begin{bmatrix} h_{1,1}S_1 + h_{1,2}S_2 + h_{1,3}S_3 & h_{1,1}S_1 + h_{1,2}e^{-j2\pi\frac{1}{3}} \cdot S_2 + h_{1,3}e^{-j2\pi\frac{2}{3}} \cdot S_3 & h_{1,1}S_1 + h_{1,2}e^{-j2\pi\frac{2}{3}} \cdot S_2 + h_{1,3}e^{-j2\pi\frac{1}{3}} \cdot S_3 \\ h_{2,1}S_1 + h_{2,2}S_2 + h_{2,3}S_3 & h_{2,1}S_1 + h_{2,2}e^{-j2\pi\frac{1}{3}} \cdot S_2 + h_{2,3}e^{-j2\pi\frac{2}{3}} \cdot S_3 & h_{2,1}S_1 + h_{2,2}e^{-j2\pi\frac{2}{3}} \cdot S_2 + h_{2,3}e^{-j2\pi\frac{1}{3}} \cdot S_3 \\ h_{3,1}S_1 + h_{3,2}S_2 + h_{3,3}S_3 & h_{3,1}S_1 + h_{3,2}e^{-j2\pi\frac{1}{3}} \cdot S_2 + h_{3,3}e^{-j2\pi\frac{2}{3}} \cdot S_3 & h_{3,1}S_1 + h_{3,2}e^{-j2\pi\frac{2}{3}} \cdot S_2 + h_{3,3}e^{-j2\pi\frac{1}{3}} \cdot S_3 \end{bmatrix} +$$

$$\begin{bmatrix} n_1^{(1)} & n_1^{(2)} & n_1^{(3)} \\ n_2^{(1)} & n_2^{(2)} & n_2^{(3)} \\ n_3^{(1)} & n_3^{(2)} & n_3^{(3)} \end{bmatrix}$$

After the MIMO processing unit 22 receives the sequence $r^{(1, 2, 3)}$ by using the three receiving antennas 21a, 21b, and 21c, the error correction decoding unit 26 of the data reception device 2 multiplies the received sequence $r^{(1, 2, 3)}$ by an orthogonal code to deform equation (25), as will be shown below.

[Equation 10]

$$r^{(1,2,3)}\begin{bmatrix} 1 & 1 & 1 \\ 1 & e^{-j2\pi\frac{2}{3}} & e^{-j2\pi\frac{1}{3}} \\ 1 & e^{-j2\pi\frac{1}{3}} & e^{-j2\pi\frac{2}{3}} \end{bmatrix} = 3\begin{bmatrix} h_{1,1}S_1 & h_{1,2}S_2 & h_{1,3}S_3 \\ h_{2,1}S_1 & h_{2,2}S_2 & h_{2,3}S_3 \\ h_{3,1}S_1 & h_{3,2}S_2 & h_{3,3}S_3 \end{bmatrix} +$$

$$\begin{bmatrix} n_1^{(1)}+n_1^{(2)}+n_1^{(3)} & n_1^{(1)}+e^{-j2\pi\frac{2}{3}}n_1^{(2)}+e^{-j2\pi\frac{1}{3}}n_1^{(3)} & n_1^{(1)}+e^{-j2\pi\frac{1}{3}}n_1^{(2)}+e^{-j2\pi\frac{2}{3}}n_1^{(3)} \\ n_2^{(1)}+n_2^{(2)}+n_2^{(3)} & n_2^{(1)}+e^{-j2\pi\frac{2}{3}}n_2^{(2)}+e^{-j2\pi\frac{1}{3}}n_2^{(3)} & n_2^{(1)}+e^{-j2\pi\frac{1}{3}}n_2^{(2)}+e^{-j2\pi\frac{2}{3}}n_2^{(3)} \\ n_3^{(1)}+n_3^{(2)}+n_3^{(3)} & n_3^{(1)}+e^{-j2\pi\frac{2}{3}}n_3^{(2)}+e^{-j2\pi\frac{1}{3}}n_3^{(3)} & n_3^{(1)}+e^{-j2\pi\frac{1}{3}}n_3^{(2)}+e^{-j2\pi\frac{2}{3}}n_3^{(3)} \end{bmatrix}$$ (26)

The error correction decoding unit 26 of the data reception device 2 also extracts $S_1$, $S_2$, and $S_3$ which construct the symbols S of the codewords by arranging equation (26) to form equation (27) and then calculating equation (27).

[Equation 11]

$$3h_{1,1}S_1h^*_{1,1}+3h_{2,1}S_1h^*_{2,1}+3h_{3,1}S_1h^*_{3,1}+n'_1=3(|h_{1,1}|^2+|h_{2,1}|^2+|h_{3,1}|^2)\cdot S_1+n'_1$$

$$3h_{1,2}S_2h^*_{1,2}+3h_{2,2}S_2h^*_{2,2}+3h_{3,2}S_2h^*_{3,2}+n'_2=3(|h_{1,2}|^2+|h_{2,2}|^2+|h_{3,2}|^2)\cdot S_2+n'_2$$

$$3h_{1,3}S_3h^*_{1,3}+3h_{2,3}S_3h^*_{2,3}+3h_{3,3}S_3h^*_{3,3}+n'_3=3(|h_{1,3}|^2+|h_{2,3}|^2+|h_{3,3}|^2)\cdot S_3+n'_3$$ (27)

where when $n'_1$, $n'_2$, $n'_3$ are defined as follows:

$$\begin{bmatrix} n'_{1,1} & n'_{1,2} & n'_{1,3} \\ n'_{2,1} & n'_{2,2} & n'_{2,3} \\ n'_{3,1} & n'_{3,2} & n'_{3,3} \end{bmatrix} = \begin{bmatrix} n_1^{(1)}+n_1^{(2)}+n_1^{(3)} & n_1^{(1)}+e^{-j2\pi\frac{2}{3}}n_1^{(2)}+e^{-j2\pi\frac{1}{3}}n_1^{(3)} & n_1^{(1)}+e^{-j2\pi\frac{1}{3}}n_1^{(2)}+e^{-j2\pi\frac{2}{3}}n_1^{(3)} \\ n_2^{(1)}+n_2^{(2)}+n_2^{(3)} & n_2^{(1)}+e^{-j2\pi\frac{2}{3}}n_2^{(2)}+e^{-j2\pi\frac{1}{3}}n_2^{(3)} & n_2^{(1)}+e^{-j2\pi\frac{1}{3}}n_2^{(2)}+e^{-j2\pi\frac{2}{3}}n_2^{(3)} \\ n_3^{(1)}+n_3^{(2)}+n_3^{(3)} & n_3^{(1)}+e^{-j2\pi\frac{2}{3}}n_3^{(2)}+e^{-j2\pi\frac{1}{3}}n_3^{(3)} & n_3^{(1)}+e^{-j2\pi\frac{1}{3}}n_3^{(2)}+e^{-j2\pi\frac{2}{3}}n_3^{(3)} \end{bmatrix}$$

they are expressed as follows:

$$n'_1 = h^*_{1,1}n'_{1,1}+h^*_{2,1}n'_{2,1}+h^*_{3,1}n'_{3,1},$$

$$n'_2 = h^*_{1,2}n'_{1,2}+h^*_{2,2}n'_{2,2}+h^*_{3,2}n'_{3,2},$$

$$n'_2 = h^*_{1,3}n'_{1,3}+h^*_{2,3}n'_{2,3}+h^*_{3,3}n'_{3,3}.$$ (28)

More specifically, the error correction decoding unit 26 of the data reception device 2 sets $h_{1,2}h_{1,1}^*S_2+h_{1,3}h_{1,1}^*S_3$ which is an interference wave to be zero ($h_{1,2}h_{1,1}^*S_2=0$, $h_{1,3}h_{1,1}^*S_3=0$), and detects $S_1$ from both the addition of signals $h_{2,1}^*h_{2,1}S_1$ and $h_{3,1}^*h_{3,1}S_1$ which are desired waves, and the average of noise components.

Figure 2:
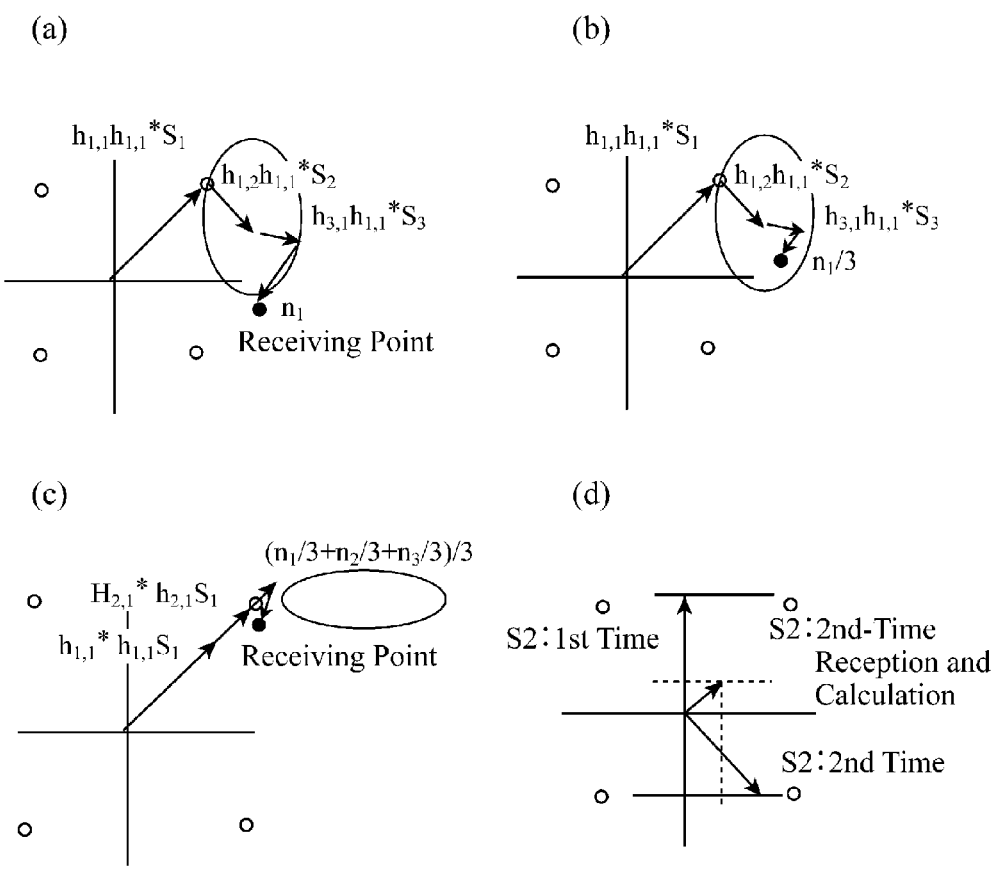
FIG. 2 is an explanatory drawing showing a principle on which reduction of noise and interference wave components is based.
Figure 3:
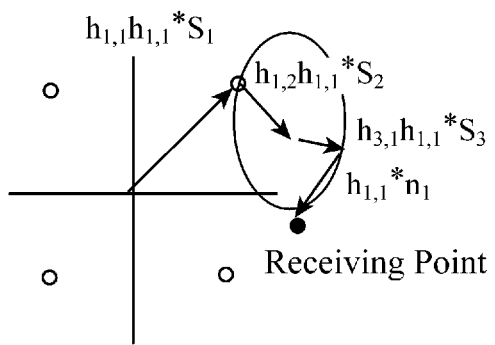
FIG. 3 is an explanatory drawing showing a principle on which reduction of only noise is based.
Figure 3:
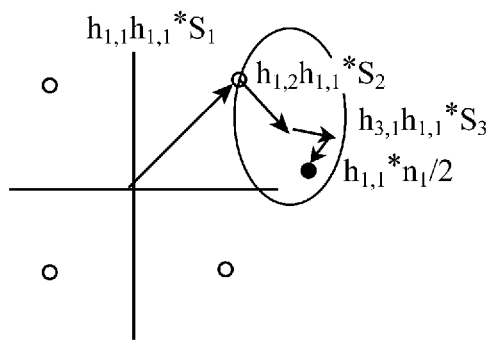

In this case, the degradation components include only the noise and the detection probability is improved (refer to FIG. 2).

According to a simple decoding method, it is assumed that both the interference and noise are degradation components as shown in FIG. 2(a). In contrast, according to a conventional method, only the noise becomes small according to HARQ-CC as shown in FIG. 2(b).

In contrast with this, in accordance with this Embodiment 1, because $S_1$ is detected from both the addition of signals $h_{2,1}^*h_{2,1}S_1$ and $h_{3,1}^*h_{3,1}S_1$ which are desired waves, and the average of the noise components, as mentioned above, the degradation components include only the noise as shown in FIG. 2(c).

In this Embodiment 1, as shown in FIG. 2(d), because the electric power of the noise components is reduced even at the time of the retransmission time with 3×3 MIMO, the improvement can be effected.

As can be seen from the above description, in accordance with this Embodiment 1, when the error correction decoding unit 26 of the data reception device 2 fails in the error correction decoding of the codeword, the MIMO processing unit 15 of the data transmission device 1 deforms the transmitted codewords according to the predetermined rule and then transmits the deformed codewords and the error correction decoding unit 26 of the data reception device 2 reproduces the data by using the deformed codewords. As a result, there is provided an advantage of being able to reduce not only the noise but the interference wave components, and to improve the success rates of the demodulation and error correction decoding greatly.

In this Embodiment 1, the case in which the error correction decoding unit 26 of the data reception device 2 extracts $S_1$, $S_2$, and $S_3$ which construct the symbols S of the codewords by arranging equation (26) to form equation (27), and calculating equation (27) is shown. As an alternative, the error correction decoding unit can extract $S_1$, $S_2$ and $S_3$ which construct the symbols S of the codewords by simplifying equation (27) into equation (29) and then calculating equation (29).

[Equation 12]

$$3h_{1,1}S_1h^*_{1,1}+h^*_{1,1}n'_{1,1}=3(|h_{1,1}|^2)\cdot S_1+h^*_{1,1}n'_{1,1}$$

$$3h_{2,2}S_2h^*_{2,2}+h^*_{2,2}n'_{2,2}=3(|h_{2,2}|^2)\cdot S_2+h^*_{2,2}n'_{2,2}$$

$$3h_{3,3}S_3h^*_{3,3}+h^*_{3,3}n'_{3,3}=3(|h_{3,3}|^2)\cdot S_3+h^*_{3,3}n'_{3,3}$$ (29)

Embodiment 2

In above-mentioned Embodiment 1, the example in which codewords are transmitted via three communication channels and interference occurs among the three communication channels is shown. In contrast, in accordance with this Embodiment 2, the example is generalized to a case in which codewords are transmitted via N communication channels and interference occurs among the N communication channels, as will be explained below.

First, a communication channel response matrix H is assumed as follows.

[Equation 13]

$$H = \begin{bmatrix} h_{1,1} & h_{1,2} & \cdots & \cdots & h_{1,N} \\ h_{2,1} & \ddots & \ddots & \ddots & \vdots \\ \vdots & \ddots & h_{i,j} & \ddots & \vdots \\ \vdots & \ddots & \ddots & \ddots & \vdots \\ h_{N,1} & \cdots & \cdots & \cdots & h_{N,N} \end{bmatrix} \quad (30)$$

where $h_{i,j}$ is a communication channel response from j-th transmitting antenna to i-th receiving antenna.

Furthermore, the symbols of codewords transmitted from an MIMO processing unit 15 of a data transmission device 1 (symbols which are obtained by modulating an error correcting code expressed by two elements) are expressed as S. For the sake of simplicity, it is assumed that no OFDM modulation is carried out in this example.

[Equation 14]

$$S = \begin{bmatrix} S_1 \\ S_2 \\ \vdots \\ S_N \end{bmatrix} \quad (31)$$

When the MIMO processing unit 15 of the data transmission device 1 transmits the symbols S of the codewords by using N transmitting antennas, an MIMO processing unit 22 of a data reception device 2 receives the symbols of the codewords by using N receiving antennas. When the received signal is expressed as r, the received signal r is shown as follows.

[Equation 15]

$$r = HS + n = \begin{bmatrix} h_{1,1} & h_{1,2} & \cdots & \cdots & h_{1,N} \\ h_{2,1} & \ddots & \ddots & \ddots & \vdots \\ \vdots & \ddots & h_{i,j} & \ddots & \vdots \\ \vdots & \ddots & \ddots & \ddots & \vdots \\ h_{N,1} & \cdots & \cdots & \cdots & h_{N,N} \end{bmatrix} \quad (32)$$

$$\begin{bmatrix} S_1 \\ S_2 \\ \vdots \\ S_N \end{bmatrix} + \begin{bmatrix} n_1 \\ n_2 \\ \vdots \\ n_N \end{bmatrix} = \begin{bmatrix} h_{1,1}S_1 + h_{1,2}S_2 + \ldots + h_{1,N}S_N \\ h_{2,1}S_1 + h_{2,2}S_2 + \ldots + h_{2,N}S_N \\ \vdots \\ h_{N,1}S_1 + h_{N,2}S_2 + \ldots + h_{N,N}S_N \end{bmatrix} + \begin{bmatrix} n_1 \\ n_2 \\ \vdots \\ n_N \end{bmatrix}$$

When the symbols $S^{(1)}$ of the codewords which are transmitted for the first time (at the time of the first-time transmission) are not decoded normally by an error correction decoding unit 26 of the data reception device 2, the MIMO processing unit 15 of the data transmission device 1 multiplies the symbols $S^{(1)}$ by a part of an orthogonal code to deform the symbols $S^{(1)}$ into symbols $S^{(2)}$. The MIMO processing unit similarly multiplies the symbols $S^{(1)}$ by a part of the orthogonal code to deform the symbols $S^{(1)}$ into symbols $S^{(N)}$.

After creating the symbols $S^{(2)}, \ldots,$ and $S^{(N)}$ in the above-mentioned way, the MIMO processing unit 15 of the data transmission device 1 sequentially transmits the symbols $S^{(2)}, \ldots,$ and $S^{(N)}$ by using the N transmitting antennas every time when a transmission request is sent to the data transmission device from the receiver after transmitting the symbols $S^{(1)}$.

[Equation 16]

$$S^{(1:N)} = [S^{(1)} \; S^{(2)} \; \cdots \; S^{(N)}] = \quad (33)$$

$$\begin{bmatrix} \alpha^0 S_1 & \alpha^0 S_1 & \alpha^0 S_1 & \cdots & \alpha^0 S_1 & \alpha^0 S_1 \\ \alpha^0 S_2 & \alpha^1 S_2 & \alpha^2 S_2 & \cdots & \alpha^{N-2} S_2 & \alpha^{N-1} S_2 \\ \alpha^0 S_3 & \alpha^2 S_3 & \alpha^3 S_3 & \cdots & \alpha^{N-1} S_3 & \alpha^1 S_3 \\ \vdots & \vdots & \vdots & \ddots & \vdots & \vdots \\ \alpha^0 S_{N-1} & \alpha^{N-2} S_{N-1} & \alpha^{N-1} S_{N-1} & \cdots & \alpha^{N-4} S_{N-1} & \alpha^{N-3} S_{N-1} \\ \alpha^0 S_N & \alpha^{N-1} S_N & \alpha^1 S_N & \cdots & \alpha^{N-3} S_N & \alpha^{N-2} S_N \end{bmatrix}$$

where $\alpha^i = \exp(-j2\pi \cdot i/N)$

After the MIMO processing unit 15 of the data transmission device 1 transmits the sequence $S^{(1:N)}$ of the symbols $S^{(2)}, \ldots,$ and $S^{(N)}$, the MIMO processing unit 22 of the data reception device 2 receives a sequence $r^{(1:N)}$ of symbols by using the N receiving antennas. This sequence $r^{(1:N)}$ is shown as follows.

[Equation 17]

$$r^{(1:N)} = HS^{(1:N)} + n^{(1:N)} = \quad (34)$$

$$\begin{bmatrix} h_{1,1}\alpha^0 S_1 + & h_{1,1}\alpha^0 S_1 + \\ h_{1,2}\alpha^0 S_2 + \ldots + & \cdots \cdots & h_{1,2}\alpha^{N-1} S_2 + \\ h_{1,N}\alpha^0 S_N & h_{1,3}\alpha^{N-1} S_2 + \ldots + \\ & h_{1,N-1}\alpha^{N-3} S_{N-1} + \\ & h_{1,N}\alpha^{N-2} S_N \\ & h_{2,1}\alpha^0 S_1 + \\ h_{2,1}\alpha^0 S_1 + & h_{2,2}\alpha^{N-1} S_2 + \\ h_{2,2}\alpha^0 S_2 + \ldots + & \cdots \cdots & h_{2,3}\alpha^{N-1} S_2 + \ldots + \\ h_{2,N}\alpha^0 S_N & h_{2,N-1}\alpha^{N-3} S_{N-1} + \\ & h_{2,N}\alpha^{N-2} S_N \\ \vdots & \vdots & \vdots \\ & h_{N,1}\alpha^0 S_1 + \\ h_{N,1}\alpha^0 S_1 + & h_{N,2}\alpha^{N-1} S_2 + \\ h_{N,2}\alpha^0 S_2 + \ldots + & \cdots \cdots & h_{N,3}\alpha^{N-1} S_2 + \ldots + \\ h_{N,N}\alpha^0 S_N & h_{N,N-1}\alpha^{N-3} S_{N-1} + \\ & h_{N,N}\alpha^{N-2} S_N \end{bmatrix} +$$

$$\begin{bmatrix} n_1^{(1)} & n_1^{(2)} & \ldots & n_1^{(N)} \\ n_2^{(1)} & n_2^{(2)} & \ldots & n_2^{(N)} \\ \vdots & \vdots & \ddots & \vdots \\ n_N^{(1)} & n_N^{(2)} & \ldots & n_N^{(N)} \end{bmatrix}$$

After the MIMO processing unit 22 receives the sequence $r^{(1:N)}$ by using the N receiving antennas, the error correction decoding unit 26 of the data reception device 2 multiplies the received sequence $r^{(1:N)}$ by an orthogonal code to deform equation (34), as will be shown below.

[Equation 18]

$$r^{(1:N)} \begin{bmatrix} \alpha^0 & \alpha^0 & \alpha^0 & \ldots & \alpha^0 & \alpha^0 \\ \alpha^0 & \alpha^{-1} & \alpha^{-2} & \ldots & \alpha^{-(N-2)} & \alpha^{-(N-1)} \\ \alpha^0 & \alpha^{-2} & \alpha^{-3} & \ldots & \alpha^{-(N-1)} & \alpha^{-1} \\ \vdots & \vdots & \vdots & \ddots & \vdots & \vdots \\ \alpha^0 & \alpha^{-(N-2)} & \alpha^{-(N-1)} & \ldots & \alpha^{-(N-4)} & \alpha^{-(N-3)} \\ \alpha^0 & \alpha^{-(N-1)} & \alpha^{-1} & \ldots & \alpha^{-(N-3)} & \alpha^{-(N-2)} \end{bmatrix} = \tag{35}$$

$$N \begin{bmatrix} h_{1,1}S_1 & h_{1,2}S_1 & \ldots & h_{1,N}S_1 \\ h_{2,1}S_2 & h_{2,2}S_2 & \ldots & h_{2,N}S_2 \\ \vdots & \vdots & \vdots & \vdots \\ h_{N,1}S_N & h_{N,2}S_N & \ldots & h_{N,N}S_N \end{bmatrix} +$$

$$\begin{bmatrix} \alpha^0 n_1^{(1)}+ & \alpha^0 n_1^{(1)}+ & \alpha^0 n_1^{(1)}+ \\ \alpha^0 n_1^{(2)}+\ldots+ & \alpha^{-1} n_1^{(2)}+\ldots+ & \ldots & \alpha^{-(N-1)} n_1^{(2)}+\ldots+ \\ \alpha^0 n_1^{(N)} & \alpha^{-(N-1)} n_1^{(N)} & \alpha^{-(N-2)} n_1^{(N)} \\ \alpha^0 n_2^{(1)}+ & \alpha^0 n_2^{(1)}+ & \alpha^0 n_2^{(1)}+ \\ \alpha^0 n_2^{(2)}+\ldots+ & \alpha^{-1} n_2^{(2)}+\ldots+ & \ldots & \alpha^{-(N-1)} n_2^{(2)}+\ldots+ \\ \alpha^0 n_2^{(N)} & \alpha^{-(N-1)} n_2^{(N)} & \alpha^{-(N-2)} n_2^{(N)} \\ \vdots & \vdots & \ddots & \vdots \\ \alpha^0 n_N^{(1)}+ & \alpha^0 n_N^{(1)}+ & \alpha^0 n_N^{(1)}+ \\ \alpha^0 n_N^{(2)}+\ldots+ & \alpha^{-1} n_N^{(2)}+\ldots+ & \ldots & \alpha^{-(N-1)} n_N^{(2)}+\ldots+ \\ \alpha^0 n_N^{(N)} & \alpha^{-(N-1)} n_N^{(N)} & \alpha^{-(N-2)} n_N^{(N)} \end{bmatrix}$$

The error correction decoding unit 26 of the data reception device 2 also extracts $S_1, S_2, \ldots,$ and $S_N$ which construct the symbols S of the codewords by arranging equation (35) to form equation (36) and then calculating equation (36).

[Equation 19]

$$Nh_{1,1}S_1 h_{1,1}^* + Nh_{1,2}S_1 h_{1,2}^* + \ldots + n_1' = \tag{36}$$
$$\quad N(|h_{1,1}|^2 + |h_{1,2}|^2 + \ldots) \cdot S_1 + n_1',$$
$$Nh_{2,1}S_2 h_{2,1}^* + Nh_{2,2}S_2 h_{2,2}^* + \ldots + n_2' =$$
$$\quad N(|h_{2,1}|^2 + |h_{2,2}|^2 + \ldots) \cdot S_2 + n_2', \ldots$$

where when $n'_1, n'_2, \ldots, n'_N$ are defined as follows:

$$\begin{bmatrix} n'_{1,1} & n'_{1,2} & \ldots & n'_{1,N} \\ n'_{2,1} & n'_{2,2} & \ldots & n'_{2,N} \\ \vdots & \vdots & \ddots & \vdots \\ n'_{N,1} & n'_{N,2} & \ldots & n'_{N,N} \end{bmatrix} =$$

$$\begin{bmatrix} \alpha^0 n_1^{(1)}+ & \alpha^0 n_1^{(1)}+ & \alpha^0 n_1^{(1)}+ \\ \alpha^0 n_1^{(2)}+\ldots+ & \alpha^{-1} n_1^{(2)}+\ldots+ & \ldots & \alpha^{-(N-1)} n_1^{(2)}+\ldots+ \\ \alpha^0 n_1^{(N)} & \alpha^{-(N-1)} n_1^{(N)} & \alpha^{-(N-2)} n_1^{(N)} \\ \alpha^0 n_2^{(1)}+ & \alpha^0 n_2^{(1)}+ & \alpha^0 n_2^{(1)}+ \\ \alpha^0 n_2^{(2)}+\ldots+ & \alpha^{-1} n_2^{(2)}+\ldots+ & \ldots & \alpha^{-(N-1)} n_2^{(2)}+\ldots+ \\ \alpha^0 n_2^{(N)} & \alpha^{-(N-1)} n_2^{(N)} & \alpha^{-(N-2)} n_2^{(N)} \\ \vdots & \vdots & \ddots & \vdots \\ \alpha^0 n_N^{(1)}+ & \alpha^0 n_N^{(1)}+ & \alpha^0 n_N^{(1)}+ \\ \alpha^0 n_N^{(2)}+\ldots+ & \alpha^{-1} n_N^{(2)}+\ldots+ & \ldots & \alpha^{-(N-1)} n_N^{(2)}+\ldots+ \\ \alpha^0 n_N^{(N)} & \alpha^{-(N-1)} n_N^{(N)} & \alpha^{-(N-2)} n_N^{(N)} \end{bmatrix}$$

they are expressed as follows:

$$n'_1 = h_{1,1}^* n'_{1,1} + h_{2,1}^* n'_{2,1} + \ldots + h_{N,1}^* n'_{N,1}, \tag{37}$$

$$n'_2 = h_{1,2}^* n'_{1,2} + h_{2,2}^* n'_{2,2} + \ldots + h_{N,2}^* n'_{N,2},$$

$$\vdots$$

In this Embodiment 2, the case in which the error correction decoding unit 26 of the data reception device 2 extracts $S_1, S_2, \ldots,$ and $S_N$ which construct the symbols S of the codewords by arranging equation (35) to form equation (36), and calculating equation (36) is shown. As an alternative, the error correction decoding unit can extract $S_1, S_2, \ldots,$ and $S_N$ which construct the symbols S of the codewords by simplifying equation (36) into equation (38) and then calculating equation (38).

[Equation 20]

$$Nh_{1,1}S_1 h_{1,1}^* + h_{1,1}^* n'_{1,1} = N(|h_{1,1}|^2) \cdot S_1 + h_{1,1}^* n'_{1,1}, \tag{38}$$
$$Nh_{2,2}S_2 h_{2,2}^* + h_{2,2}^* n'_{2,2} = N(|h_{2,2}|^2) \cdot S_2 + h_{2,2}^* n'_{2,2},$$
$$\vdots$$

Embodiment 3

In above-mentioned Embodiment 1, the example in which codewords are transmitted via three communication channels and interference occurs among the three communication channels is shown. In contrast, in accordance with this Embodiment 3, the example is generalized to a case in which codewords are transmitted via N communication channels and interference occurs among the N communication channels, as will be explained below.

In this embodiment, N is a power of two, and, in this Embodiment 3, a case of N=2 will be explained as an example.

First, a communication channel response matrix H is assumed as follows.

[Equation 21]

$$H = \begin{bmatrix} h_{1,1} & h_{1,2} \\ h_{2,1} & h_{2,2} \end{bmatrix} \quad (39)$$

where $h_{i,j}$ is a communication channel response from j-th transmitting antenna to i-th receiving antenna.

Furthermore, the symbols of codewords transmitted from an MIMO processing unit 15 of a data transmission device 1 (symbols which are obtained by modulating an error correcting code expressed by two elements) are expressed as S. For the sake of simplicity, it is assumed that no OFDM modulation is carried out in this example.

[Equation 22]

$$S = \begin{bmatrix} S_1 \\ S_2 \end{bmatrix} \quad (40)$$

When the MIMO processing unit 15 of the data transmission device 1 transmits the symbols S of the codewords by using two transmitting antennas 16a and 16b, an MIMO processing unit 22 of a data reception device 2 receives the symbols of the codewords by using two receiving antennas 21a and 21b. When the received signal is expressed as r, the received signal r is shown as follows.

[Equation 23]

$$r = HS + n = \begin{bmatrix} h_{1,1} & h_{1,2} \\ h_{2,1} & h_{2,2} \end{bmatrix} \begin{bmatrix} S_1 \\ S_2 \end{bmatrix} = \begin{bmatrix} h_{1,1}S_1 + h_{1,2}S_2 \\ h_{2,1}S_1 + h_{2,2}S_2 \end{bmatrix} + \begin{bmatrix} n_1 \\ n_2 \end{bmatrix} \quad (41)$$

When the symbols $S^{(1)}$ of the codewords which are transmitted for the first time (at the time of the first-time transmission) are not decoded normally by an error correction decoding unit 26 of the data reception device 2, the MIMO processing unit 15 of the data transmission device 1 multiplies the symbols $S^{(1)}$ by a part of an orthogonal code to deform the symbols $S^{(1)}$ into symbols $S^{(2)}$.

After creating the symbols $S^{(2)}$ in the above-mentioned way, the MIMO processing unit 15 of the data transmission device 1 transmits the symbols $S^{(2)}$ by using the two transmitting antennas 16a and 16b after transmitting the symbols $S^{(1)}$.

[Equation 24]

$$S^{(1)} = \begin{bmatrix} S_1 \\ S_2 \end{bmatrix}, S^{(2)} = \begin{bmatrix} S_1 \\ -S_2 \end{bmatrix} \quad (42)$$

After the MIMO processing unit 15 of the data transmission device 1 transmits the sequence $S^{(1, 2)}$ of the symbols $S^{(1)}$ and $S^{(2)}$, the MIMO processing unit 22 of the data reception device 2 receives a sequence $r^{(1, 2)}$ of symbols by using the two receiving antennas 21a and 21b. This sequence $r^{(1, 2)}$ is shown as follows.

[Equation 25]

$$r^{(1,2)} = H[S^{(1)} \; S^{(2)}] + n^{(1,2)} = \begin{bmatrix} h_{1,1} & h_{1,2} \\ h_{2,1} & h_{2,2} \end{bmatrix} \begin{bmatrix} S_1 & S_1 \\ S_2 & -S_2 \end{bmatrix} + \quad (43)$$

$$n^{(1,2)} = \begin{bmatrix} h_{1,1}S_1 + h_{1,2}S_2 & h_{1,1}S_1 - h_{1,2}S_2 \\ h_{2,1}S_1 + h_{2,2}S_2 & h_{2,1}S_1 - h_{2,2}S_2 \end{bmatrix} + \begin{bmatrix} n_1^{(1)} & n_1^{(2)} \\ n_2^{(1)} & n_2^{(2)} \end{bmatrix}$$

After the MIMO processing unit 22 receives the sequence $r^{(1, 2)}$ by using the two receiving antennas 21a and 21b, the error correction decoding unit 26 of the data reception device 2 multiplies the received sequence $r^{(1, 2)}$ by an orthogonal code to deform equation (43), as will be shown below.

[Equation 26]

$$r^{(1,2)} \begin{bmatrix} 1 & 1 \\ 1 & -1 \end{bmatrix} = 2 \begin{bmatrix} h_{1,1}S_1 & h_{1,2}S_2 \\ h_{2,1}S_1 & h_{2,2}S_2 \end{bmatrix} + \begin{bmatrix} n_1^{(1)} + n_1^{(2)} & n_1^{(1)} - n_1^{(2)} \\ n_2^{(1)} + n_2^{(2)} & n_2^{(1)} - n_2^{(2)} \end{bmatrix} \quad (44)$$

The error correction decoding unit 26 of the data reception device 2 also extracts $S_1$ and $S_2$ which construct the symbols S of the codewords by arranging equation (44) to form equation (45) and then calculating equation (45).

[Equation 27]

$$2h_{1,1}S_1 h^*_{1,1} + 2h_{2,1}S_1 h^*_{2,1} + n'_1 = 2(|h_{1,1}|^2 + |h_{2,1}|^2) \cdot S_1 + n'_1$$

$$2h_{1,2}S_2 h^*_{1,2} + 2h_{2,2}S_2 h^*_{2,2} + n'_2 = 2(|h_{2,1}|^2 + |h_{2,2}|^2) \cdot S_2 + n'_2 \quad (45)$$

where when $n'_1$, $n'_2$ are defined as follows:

$$\begin{bmatrix} n'_{1,1} & n'_{1,2} \\ n'_{2,1} & n'_{2,2} \end{bmatrix} = \begin{bmatrix} n_1^{(1)} + n_1^{(2)} & n_1^{(1)} - n_1^{(2)} \\ n_2^{(1)} + n_2^{(2)} & n_2^{(1)} - n_2^{(2)} \end{bmatrix}$$

they are expressed as follows:

$$n'_1 = h^*_{1,1} n'_{1,1} + h^*_{2,1} n'_{2,1},$$

$$n'_2 = h^*_{1,2} n'_{1,2} + h^*_{2,2} n'_{2,2}. \quad (46)$$

In this Embodiment 3, the case in which the error correction decoding unit 26 of the data reception device 2 extracts $S_1$ and $S_2$ which construct the symbols S of the codewords by arranging equation (44) to form equation (45), and calculating equation (45) is shown. As an alternative, the error correction decoding unit can extract $S_1$ and $S_2$ which construct the symbols S of the codewords by simplifying equation (45) into equation (47) and then calculating equation (47).

[Equation 28]

$$2h_{1,1}S_1 h^*_{1,1} + h^*_{1,1} n'_{1,1} = 2(|h_{1,1}|^2) \cdot S_1 + h^*_{1,1} n'_{1,1}$$

$$2h_{2,2}S_2 h^*_{2,2} + h^*_{2,2} n'_{2,2} = 2(|h_{2,2}|^2) \cdot S_2 + h^*_{2,2} n'_{2,2} \quad (47)$$

Embodiment 4

In above-mentioned Embodiment 3, the case of N=2 is shown. In contrast, in this Embodiment 4, a case of N=4 will be shown.

First, a communication channel response matrix H is assumed as follows.

[Equation 29]

$$H = \begin{bmatrix} h_{1,1} & h_{1,2} & h_{1,3} & h_{1,4} \\ h_{2,1} & h_{2,2} & h_{2,3} & h_{2,4} \\ h_{3,1} & h_{3,2} & h_{3,3} & h_{3,4} \\ h_{4,1} & h_{4,2} & h_{4,3} & h_{4,4} \end{bmatrix} \quad (48)$$

where $h_{i,j}$ is a communication channel response from j-th transmitting antenna to i-th receiving antenna.

Furthermore, the symbols of codewords transmitted from an MIMO processing unit 15 of a data transmission device 1 (symbols which are obtained by modulating an error correcting code expressed by two elements) are expressed as S. For the sake of simplicity, it is assumed that no OFDM modulation is carried out in this example.

[Equation 30]

$$S = \begin{bmatrix} S_1 \\ S_2 \\ S_3 \\ S_4 \end{bmatrix} \quad (49)$$

When the MIMO processing unit 15 of the data transmission device 1 transmits the symbols S of the codewords by using four transmitting antennas 16a, 16b, 16c, and 16d, an MIMO processing unit 22 of a data reception device 2 receives the symbols of codewords by using four receiving antennas 21a, 21b, 21c, and 21d. When the received signal is expressed as r, the received signal r is shown as follows.

[Equation 31]

$$r = HS + n = \begin{bmatrix} h_{1,1}S_1 + h_{1,2}S_2 + h_{1,3}S_3 + h_{1,4}S_4 \\ h_{2,1}S_1 + h_{2,2}S_2 + h_{2,3}S_3 + h_{2,4}S_4 \\ h_{3,1}S_1 + h_{3,2}S_2 + h_{3,3}S_3 + h_{3,4}S_4 \\ h_{4,1}S_1 + h_{4,2}S_2 + h_{4,3}S_3 + h_{4,4}S_4 \end{bmatrix} + \begin{bmatrix} n_1 \\ n_2 \\ n_3 \\ n_4 \end{bmatrix} \quad (50)$$

When the symbols $S^{(1)}$ of the codewords which are transmitted for the first time (at the time of the first-time transmission) are not decoded normally by an error correction decoding unit 26 of the data reception device 2, the MIMO processing unit 15 of the data transmission device 1 multiplies the symbols $S^{(1)}$ by a part of an orthogonal code to deform the symbols $S^{(1)}$ into symbols $S^{(2)}$. The MIMO processing unit also multiplies the symbols $S^{(1)}$ by a part of the orthogonal code to deform the symbols $S^{(1)}$ into symbols $S^{(3)}$. The MIMO processing unit further multiplies the symbols $S^{(1)}$ by a part of the orthogonal code to deform the symbols $S^{(1)}$ into symbols $S^{(4)}$.

After creating the symbols $S^{(2)}$, $S^{(3)}$, and $S^{(4)}$ in the above-mentioned way, the MIMO processing unit 15 of the data transmission device 1 sequentially transmits the symbols $S^{(2)}$, $S^{(3)}$, and $S^{(4)}$ by using the four transmitting antennas 16a, 16b, 16c, and 16d after transmitting the symbols $S^{(1)}$.

[Equation 32]

$$S^{(1)} = \begin{bmatrix} S_1 \\ S_2 \\ S_3 \\ S_4 \end{bmatrix}, S^{(2)} = \begin{bmatrix} S_1 \\ -S_2 \\ S_3 \\ -S_4 \end{bmatrix}, S^{(3)} = \begin{bmatrix} S_1 \\ S_2 \\ -S_3 \\ -S_4 \end{bmatrix}, S^{(4)} = \begin{bmatrix} S_1 \\ -S_2 \\ -S_3 \\ S_4 \end{bmatrix} \quad (51)$$

After the MIMO processing unit 15 of the data transmission device 1 transmits the sequence $S^{(1, 2, 3, 4)}$ of the symbols $S^{(1)}$, $S^{(2)}$, $S^{(3)}$ and $S^{(4)}$, the MIMO processing unit 22 of the data reception device 2 receives a sequence $r^{(1, 2, 3, 4)}$ of symbols by using the four receiving antennas 21a, 21b, 21c, and 21d. This sequence $r^{(1, 2, 3, 4)}$ is shown as follows.

[Equation 33]

$$r^{(1,2,3,4)} = H[S^{(1)} \; S^{(2)} \; S^{(3)} \; S^{(4)}] + n^{(1,2,3,4)} = \begin{bmatrix} h_{1,1} & h_{1,2} & h_{1,3} & h_{1,4} \\ h_{2,1} & h_{2,2} & h_{2,3} & h_{2,4} \\ h_{3,1} & h_{3,2} & h_{3,3} & h_{3,4} \\ h_{4,1} & h_{4,2} & h_{4,3} & h_{4,4} \end{bmatrix} \begin{bmatrix} S_1 & S_1 & S_1 & S_1 \\ S_2 & -S_2 & S_2 & -S_2 \\ S_3 & S_3 & -S_3 & -S_3 \\ S_4 & -S_4 & -S_4 & S_4 \end{bmatrix} +$$

$$n^{(1,2,3,4)} \begin{bmatrix} h_{1,1}S_1 + h_{1,2}S_2 + & h_{1,1}S_1 - h_{1,2}S_2 + & h_{1,1}S_1 + h_{1,2}S_2 - & h_{1,1}S_1 - h_{1,2}S_2 - \\ h_{1,3}S_3 + h_{1,4}S_4 & h_{1,3}S_3 - h_{1,4}S_4 & h_{1,3}S_3 - h_{1,4}S_4 & h_{1,3}S_3 + h_{1,4}S_4 \\ h_{2,1}S_1 + h_{2,2}S_2 + & h_{2,1}S_1 - h_{2,2}S_2 + & h_{2,1}S_1 + h_{2,2}S_2 - & h_{2,1}S_1 - h_{2,2}S_2 - \\ h_{2,3}S_3 + h_{2,4}S_4 & h_{2,3}S_3 - h_{2,4}S_4 & h_{2,3}S_3 - h_{2,4}S_4 & h_{2,3}S_3 + h_{2,4}S_4 \\ h_{3,1}S_1 + h_{3,2}S_2 + & h_{3,1}S_1 - h_{3,2}S_2 + & h_{3,1}S_1 + h_{3,2}S_2 - & h_{3,1}S_1 - h_{3,2}S_2 - \\ h_{3,3}S_3 + h_{3,4}S_4 & h_{3,3}S_3 - h_{3,4}S_4 & h_{3,3}S_3 - h_{3,4}S_4 & h_{3,3}S_3 + h_{3,4}S_4 \\ h_{4,1}S_1 + h_{4,2}S_2 + & h_{4,1}S_1 - h_{4,2}S_2 & h_{4,1}S_1 + h_{4,2}S_2 - & h_{4,1}S_1 - h_{4,2}S_2 - \\ h_{4,3}S_3 + h_{4,4}S_4 & +h_{4,3}S_3 - h_{4,4}S_4 & h_{4,3}S_3 - h_{4,4}S_4 & h_{4,3}S_3 + h_{4,4}S_4 \end{bmatrix} + \begin{bmatrix} n_1^{(1)} & n_1^{(2)} & n_1^{(3)} & n_1^{(4)} \\ n_2^{(1)} & n_2^{(2)} & n_2^{(3)} & n_2^{(4)} \\ n_3^{(1)} & n_3^{(2)} & n_3^{(3)} & n_3^{(4)} \\ n_4^{(1)} & n_4^{(2)} & n_4^{(3)} & n_4^{(4)} \end{bmatrix} \quad (52)$$

After the MIMO processing unit 22 receives the sequence $r^{(1, 2, 3, 4)}$ by using the four receiving antennas 21a, 21b, 21c, and 21d, the error correction decoding unit 26 of the data reception device 2 multiplies the received sequence $r^{(1, 2, 3, 4)}$ by an orthogonal code to deform equation (52), as will be shown below.

[Equation 34]

$$r^{(1,2,3,4)} \begin{bmatrix} 1 & 1 & 1 & 1 \\ 1 & -1 & 1 & -1 \\ 1 & 1 & -1 & -1 \\ 1 & -1 & -1 & 1 \end{bmatrix} = 4 \begin{bmatrix} h_{1,1}S_1 & h_{1,2}S_2 & h_{1,3}S_3 & h_{1,4}S_4 \\ h_{2,1}S_1 & h_{2,2}S_2 & h_{2,3}S_3 & h_{2,4}S_4 \\ h_{3,1}S_1 & h_{3,2}S_2 & h_{3,3}S_3 & h_{3,4}S_4 \\ h_{4,1}S_1 & h_{4,2}S_2 & h_{4,3}S_3 & h_{4,4}S_4 \end{bmatrix} + \quad (53)$$

$$\begin{bmatrix} n_1^{(1)}+n_1^{(2)}+ & n_1^{(1)}-n_1^{(2)}+ & n_1^{(1)}+n_1^{(2)}- & n_1^{(1)}-n_1^{(2)}- \\ n_1^{(3)}+n_1^{(4)} & n_1^{(3)}-n_1^{(4)} & n_1^{(3)}-n_1^{(4)} & n_1^{(3)}+n_1^{(4)} \\ n_2^{(1)}+n_2^{(2)}+ & n_2^{(1)}-n_2^{(2)}+ & n_2^{(1)}+n_2^{(2)}- & n_2^{(1)}-n_2^{(2)}- \\ n_2^{(3)}+n_2^{(4)} & n_2^{(3)}-n_2^{(4)} & n_2^{(3)}-n_2^{(4)} & n_2^{(3)}+n_2^{(4)} \\ n_3^{(1)}+n_3^{(2)}+ & n_3^{(1)}-n_3^{(2)}+ & n_3^{(1)}+n_3^{(2)}- & n_3^{(1)}-n_3^{(2)}- \\ n_3^{(3)}+n_3^{(4)} & n_3^{(3)}-n_3^{(4)} & n_3^{(3)}-n_3^{(4)} & n_3^{(3)}+n_3^{(4)} \\ n_4^{(1)}+n_4^{(2)}+ & n_4^{(1)}-n_4^{(2)}+ & n_4^{(1)}+n_4^{(2)}- & n_4^{(1)}-n_4^{(2)}- \\ n_4^{(3)}+n_4^{(4)} & n_4^{(3)}-n_4^{(4)} & n_4^{(3)}-n_4^{(4)} & n_4^{(3)}+n_4^{(4)} \end{bmatrix}$$

The error correction decoding unit 26 of the data reception device 2 also extracts $S_1$, $S_2$, $S_3$, and $S_4$ which construct the symbols S of the codewords by arranging equation (53) to form equation (54) and then calculating equation (54).

[Equation 35]

$$4h_{1,1}S_1 h^*_{1,1} + 4h_{2,1}S_1 h^*_{2,1} + 4h_{3,1}S_1 h^*_{3,1} + 4h_{4,1}S_1 h^*_{4,1} + n'_1 = 4(|h_{1,1}|^2 + |h_{2,1}|^2 + |h_{3,1}|^2 + |h_{4,1}|^2) \cdot S_1 + n'_1$$

$$4h_{1,2}S_2 h^*_{1,2} + 4h_{2,2}S_2 h^*_{2,2} + 4h_{3,2}S_2 h^*_{3,2} + 4h_{4,2}S_2 h^*_{4,2} + n'_2 = 4(|h_{1,2}|^2 + |h_{2,2}|^2 + |h_{3,2}|^2 + |h_{4,2}|^2) \cdot S_2 + n'_2$$

$$4h_{1,3}S_3 h^*_{1,3} + 4h_{2,3}S_3 h^*_{2,3} + 4h_{3,3}S_3 h^*_{3,3} + 4h_{4,3}S_3 h^*_{4,3} + n'_3 = 4(|h_{1,3}|^2 + |h_{2,3}|^2 + |h_{3,3}|^2 + |h_{4,3}|^2) \cdot S_3 + n'_3$$

$$4h_{1,4}S_4 h^*_{1,4} + 4h_{2,4}S_4 h^*_{2,4} + 4h_{3,4}S_4 h^*_{3,4} + 4h_{4,4}S_4 h^*_{4,4} + n'_4 = 4(|h_{1,4}|^2 + |h_{2,4}|^2 + |h_{3,4}|^2 + |h_{4,4}|^2) \cdot S_4 + n'_4 \quad (54)$$

where when $n'_1$, $n'_2$, $n'_3$, $n'_4$ are defined as follows:

$$\begin{bmatrix} n'_{1,1} & n'_{1,2} & n'_{1,3} & n'_{1,4} \\ n'_{2,1} & n'_{2,2} & n'_{2,3} & n'_{2,4} \\ n'_{3,1} & n'_{3,2} & n'_{3,3} & n'_{3,4} \\ n'_{4,1} & n'_{4,2} & n'_{4,3} & n'_{4,4} \end{bmatrix} =$$

$$\begin{bmatrix} n_1^{(1)}+n_1^{(2)}+ & n_1^{(1)}-n_1^{(2)}+ & n_1^{(1)}+n_1^{(2)}- & n_1^{(1)}-n_1^{(2)}- \\ n_1^{(3)}+n_1^{(4)} & n_1^{(3)}-n_1^{(4)} & n_1^{(3)}-n_1^{(4)} & n_1^{(3)}+n_1^{(4)} \\ n_2^{(1)}+n_2^{(2)}+ & n_2^{(1)}-n_2^{(2)}+ & n_2^{(1)}+n_2^{(2)}- & n_2^{(1)}-n_2^{(2)}- \\ n_2^{(3)}+n_2^{(4)} & n_2^{(3)}-n_2^{(4)} & n_2^{(3)}-n_2^{(4)} & n_2^{(3)}+n_2^{(4)} \\ n_3^{(1)}+n_3^{(2)}+ & n_3^{(1)}-n_3^{(2)}+ & n_3^{(1)}+n_3^{(2)}- & n_3^{(1)}-n_3^{(2)}- \\ n_3^{(3)}+n_3^{(4)} & n_3^{(3)}-n_3^{(4)} & n_3^{(3)}-n_3^{(4)} & n_3^{(3)}+n_3^{(4)} \\ n_4^{(1)}+n_4^{(2)}+ & n_4^{(1)}-n_4^{(2)}+ & n_4^{(1)}+n_4^{(2)}- & n_4^{(1)}-n_4^{(2)}- \\ n_4^{(3)}+n_4^{(4)} & n_4^{(3)}-n_4^{(4)} & n_4^{(3)}-n_4^{(4)} & n_4^{(3)}+n_4^{(4)} \end{bmatrix}$$

they are expressed as follows:

$$n'_1 = h^*_{1,1}n'_{1,1} + h^*_{2,1}n'_{2,1} + h^*_{3,1}n'_{3,1} + h^*_{4,1}n'_{4,1},$$

$$n'_2 = h^*_{1,2}n'_{1,2} + h^*_{2,2}n'_{2,2} + h^*_{3,2}n'_{3,2} + h^*_{4,2}n'_{4,2},$$

$$n'_3 = h^*_{1,3}n'_{1,3} + h^*_{2,3}n'_{2,3} + h^*_{3,3}n'_{3,3} + h^*_{4,3}n'_{4,3},$$

$$n'_4 = h^*_{1,4}n'_{1,4} + h^*_{2,4}n'_{2,4} + h^*_{3,4}n'_{3,4} + h^*_{4,4}n'_{4,4}, \quad (55)$$

In this Embodiment 4, the case in which the error correction decoding unit 26 of the data reception device 2 extracts $S_1$, $S_2$, $S_3$, and $S_4$ which construct the symbols S of the codewords by arranging equation (53) to form equation (54), and calculating equation (54) is shown. As an alternative, the error correction decoding unit can extract $S_1$, $S_2$, $S_3$, and $S_4$ which construct the symbols S of the codewords by simplifying equation (54) into equation (56) and then calculating equation (56).

[Equation 36]

$$4h_{1,1}S_1 h^*_{1,1} + h^*_{1,1}n'_{1,1} = 4(|h_{1,1}|^2) \cdot S_1 + h^*_{1,1}n'_{1,1}$$

$$4h_{2,2}S_2 h^*_{2,2} + h^*_{2,2}n'_{2,2} = 4(|h_{2,2}|^2) \cdot S_2 + h^*_{2,2}n'_{2,2}$$

$$4h_{3,3}S_3 h^*_{3,3} + h^*_{3,3}n'_{3,3} = 4(|h_{3,3}|^2) \cdot S_3 + h^*_{3,3}n'_{3,3}$$

$$4h_{4,4}S_4 h^*_{4,4} + h^*_{4,4}n'_{4,4} = 4(|h_{4,4}|^2) \cdot S_4 + h^*_{4,4}n'_{4,4} \quad (56)$$

Embodiment 5

In above-mentioned Embodiments 3 and 4, the case of N=2 and the case of N=4 are shown respectively. In contrast, in accordance with this Embodiment 2, the example is generalized to a case in which codewords are transmitted via N communication channels and interference occurs among the N communication channels, as will be explained below. In this embodiment, N is a power of two.

First, a communication channel response matrix H is assumed as follows.

[Equation 37]

$$H = \begin{bmatrix} h_{1,1} & h_{1,2} & \ldots & \ldots & h_{1,N} \\ h_{2,1} & \ddots & \ddots & \ddots & \vdots \\ \vdots & \ddots & h_{i,j} & \ddots & \vdots \\ \vdots & \ddots & \ddots & \ddots & \vdots \\ h_{N,1} & \ldots & \ldots & \ldots & h_{N,N} \end{bmatrix} \quad (57)$$

where $h_{i,j}$ is a communication channel response from j-th transmitting antenna to i-th receiving antenna.

Furthermore, the symbols of codewords transmitted from an MIMO processing unit 15 of a data transmission device 1 (symbols which are obtained by modulating an error correcting code expressed by two elements) are expressed as S. For the sake of simplicity, it is assumed that no OFDM modulation is carried out in this example.

[Equation 38]

$$S = \begin{bmatrix} S_1 \\ S_2 \\ \vdots \\ S_N \end{bmatrix} \quad (58)$$

When the MIMO processing unit 15 of the data transmission device 1 transmits the symbols S of the codewords by using N transmitting antennas, an MIMO processing unit 22 of a data reception device 2 receives the symbols of the codewords by using N receiving antennas. When the received signal is expressed as r, the received signal r is shown as follows.

[Equation 39]

$$r = HS + n = \begin{bmatrix} h_{1,1} & h_{1,2} & \cdots & \cdots & h_{1,N} \\ h_{2,1} & \ddots & \ddots & \ddots & \vdots \\ \vdots & \ddots & h_{i,j} & \ddots & \vdots \\ \vdots & \ddots & \ddots & \ddots & \vdots \\ h_{N,1} & \cdots & \cdots & \cdots & h_{N,N} \end{bmatrix} \quad (59)$$

$$\begin{bmatrix} S_1 \\ S_2 \\ \vdots \\ S_N \end{bmatrix} + \begin{bmatrix} n_1 \\ n_2 \\ \vdots \\ n_N \end{bmatrix} = \begin{bmatrix} h_{1,1}S_1 + h_{1,2}S_2 + \ldots + h_{1,N}S_N \\ h_{2,1}S_1 + h_{2,2}S_2 + \ldots + h_{2,N}S_N \\ \vdots \\ h_{N,1}S_1 + h_{N,2}S_2 + \ldots + h_{N,N}S_N \end{bmatrix} + \begin{bmatrix} n_1 \\ n_2 \\ \vdots \\ n_N \end{bmatrix}$$

When the symbols $S^{(1)}$ of the codewords which are transmitted for the first time (at the time of the first-time transmission) are not decoded normally by an error correction decoding unit 26 of the data reception device 2, the MIMO processing unit 15 of the data transmission device 1 multiplies the symbols $S^{(1)}$ by a part of an orthogonal code to deform the symbols $S^{(1)}$ into symbols $S^{(2)}$. The MIMO processing unit similarly multiplies the symbols $S^{(1)}$ by a part of the orthogonal code to deform the symbols $S^{(1)}$ into symbols $S^{(N)}$.

After creating the symbols $S^{(2)}, \ldots,$ and $S^{(N)}$ in the above-mentioned way, the MIMO processing unit 15 of the data transmission device 1 sequentially transmits the symbols $S^{(2)}, \ldots,$ and $S^{(N)}$ by using the N transmitting antennas every time when a transmission request is sent to the data transmission device from the receiver after transmitting the symbols $S^{(1)}$.

[Equation 40]

$$S^{(1:N)} = [S^{(1)}\ S^{(2)}\ \ldots\ S^{(N)}] = \begin{bmatrix} \gamma_{1,1}S_1 & \gamma_{1,2}S_1 & \cdots & \gamma_{1,N}S_1 \\ \gamma_{2,1}S_2 & \gamma_{2,2}S_2 & \cdots & \gamma_{2,N}S_2 \\ \vdots & \vdots & \ddots & \vdots \\ \gamma_{N,1}S_N & \gamma_{N,2}S_N & \cdots & \gamma_{N,N}S_N \end{bmatrix}, \quad (60)$$

where $\gamma_{i,j}$ is a component of an Hadamard matrix (a component of an orthogonal code), and, in the case of N=4, is expressed as follows:

$$\begin{bmatrix} \gamma_{1,1} & \gamma_{1,2} & \gamma_{1,3} & \gamma_{1,4} \\ \gamma_{2,1} & \gamma_{2,2} & \gamma_{2,3} & \gamma_{2,4} \\ \gamma_{3,1} & \gamma_{3,2} & \gamma_{3,3} & \gamma_{3,4} \\ \gamma_{4,1} & \gamma_{4,2} & \gamma_{4,3} & \gamma_{4,4} \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

After the MIMO processing unit 15 of the data transmission device 1 transmits the sequence $S^{(1:N)}$ of the symbols $S^{(2)}, \ldots,$ and $S^{(N)}$, the MIMO processing unit 22 of the data reception device 2 receives a sequence $r^{(1:N)}$ of symbols by using the N receiving antennas. This sequence $r^{(1:N)}$ is shown as follows.

[Equation 41]

$$r^{(1:N)} = HS^{(1:N)} + n^{(1:N)} \quad (61)$$

After the MIMO processing unit 22 receives the sequence $r^{(1:N)}$ by using the N receiving antennas, the error correction decoding unit 26 of the data reception device 2 multiplies the received sequence $r^{(1:N)}$ by an Hadamard matrix which is an orthogonal code to deform equation (61), as will be shown below.

[Equation 42]

$$r^{(1:N)} \begin{bmatrix} \gamma_{1,1} & \gamma_{1,2} & \cdots & \gamma_{1,N} \\ \gamma_{2,1} & \gamma_{2,2} & \cdots & \gamma_{2,N} \\ \vdots & \vdots & \ddots & \vdots \\ \gamma_{N,1} & \gamma_{N,2} & \cdots & \gamma_{N,N} \end{bmatrix} = \quad (62)$$

$$N \begin{bmatrix} h_{1,1}S_1 & h_{1,2}S_1 & \cdots & h_{1,N}S_1 \\ h_{2,1}S_2 & h_{2,2}S_2 & \cdots & h_{2,N}S_2 \\ \vdots & \vdots & \vdots & \vdots \\ h_{N,1}S_N & h_{N,2}S_N & \cdots & h_{N,N}S_N \end{bmatrix} + \begin{bmatrix} \gamma_{1,1}n_1^{(1)} + \gamma_{2,1}n_1^{(2)} + & \gamma_{1,2}n_1^{(1)} + \gamma_{2,2}n_1^{(2)} + & & \gamma_{1,N}n_1^{(1)} + \gamma_{2,N}n_1^{(2)} + \\ \ldots + \gamma_{N,1}n_1^{(N)} & \ldots + \gamma_{N,2}n_1^{(N)} & \cdots & \ldots + \gamma_{N,N}n_1^{(N)} \\ \gamma_{1,1}n_2^{(1)} + \gamma_{2,1}n_2^{(2)} + & \gamma_{1,2}n_2^{(1)} + \gamma_{2,2}n_2^{(2)} + & & \gamma_{1,N}n_2^{(1)} + \gamma_{2,N}n_2^{(2)} + \\ \ldots + \gamma_{N,1}n_2^{(N)} & \ldots + \gamma_{N,2}n_2^{(N)} & \cdots & \ldots + \gamma_{N,N}n_2^{(N)} \\ \vdots & \vdots & \ddots & \vdots \\ \gamma_{1,1}n_N^{(1)} + \gamma_{2,1}n_N^{(2)} + & \gamma_{1,2}n_N^{(1)} + \gamma_{2,2}n_N^{(2)} + & & \gamma_{1,N}n_N^{(1)} + \gamma_{2,N}n_N^{(2)} + \\ \ldots + \gamma_{N,1}n_N^{(N)} & \ldots + \gamma_{N,2}n_N^{(N)} & \cdots & \ldots + \gamma_{N,N}n_N^{(N)} \end{bmatrix}$$

The error correction decoding unit 26 of the data reception device 2 also extracts $S_1, S_2, \ldots,$ and $S_N$ which construct the symbols S of the codewords by arranging equation (62) to form equation (63) and then calculating equation (63).

[Equation 43]

$$Nh_{1,1}S_1h_{1,1}^* + Nh_{1,2}S_1h_{1,2}^* + \ldots + n_1' = \quad (63)$$
$$N(|h_{1,1}|^2 + |h_{1,2}|^2 + \ldots )\cdot S_1 + n_1',$$
$$Nh_{2,1}S_2h_{2,1}^* + Nh_{2,2}S_2h_{2,2}^* + \ldots + n_2' =$$
$$N(|h_{2,1}|^2 + |h_{2,2}|^2 + \ldots )\cdot S_2 + n_2', \ldots$$
$$\vdots$$

where when $n'_1, n'_2, \ldots, n'_N$ are defined as follows:

$$\begin{bmatrix} n'_{1,1} & n'_{1,2} & \ldots & n'_{1,N} \\ n'_{2,1} & n'_{2,2} & \ldots & n'_{2,N} \\ \vdots & \vdots & \ddots & \vdots \\ n'_{N,1} & n'_{N,2} & \ldots & n'_{N,N} \end{bmatrix} =$$

$$\begin{bmatrix} \gamma_{1,1}n_1^{(1)} + \gamma_{2,1}n_1^{(2)} + & \gamma_{1,2}n_1^{(1)} + \gamma_{2,2}n_1^{(2)} + & \cdots & \gamma_{1,N}n_1^{(1)} + \gamma_{2,N}n_1^{(2)} + \\ \ldots + \gamma_{N,1}n_1^{(N)} & \ldots + \gamma_{N,2}n_1^{(N)} & & \ldots + \gamma_{N,N}n_1^{(N)} \\ \gamma_{1,1}n_2^{(1)} + \gamma_{2,1}n_2^{(2)} + & \gamma_{1,2}n_2^{(1)} + \gamma_{2,2}n_2^{(2)} + & \cdots & \gamma_{1,N}n_2^{(1)} + \gamma_{2,N}n_2^{(2)} + \\ \ldots + \gamma_{N,1}n_2^{(N)} & \ldots + \gamma_{N,2}n_2^{(N)} & & \ldots + \gamma_{N,N}n_2^{(N)} \\ \vdots & \vdots & \ddots & \vdots \\ \gamma_{1,1}n_N^{(1)} + \gamma_{2,1}n_N^{(2)} + & \gamma_{1,2}n_N^{(1)} + \gamma_{2,2}n_N^{(2)} + & \cdots & \gamma_{1,N}n_N^{(1)} + \gamma_{2,N}n_N^{(2)} + \\ \ldots + \gamma_{N,1}n_N^{(N)} & \ldots + \gamma_{N,2}n_N^{(N)} & & \ldots + \gamma_{N,N}n_N^{(N)} \end{bmatrix}$$

they are expressed as follows:

$$n'_1 = h_{1,1}^*n'_{1,1} + h_{2,1}^*n'_{2,1} + \ldots + h_{N,1}^*n'_{N,1}, \quad (64)$$
$$n'_2 = h_{1,2}^*n'_{1,2} + h_{2,2}^*n'_{2,2} + \ldots + h_{N,2}^*n'_{N,2},$$
$$\vdots$$

In this Embodiment 5, the case in which the error correction decoding unit 26 of the data reception device 2 extracts $S_1, S_2, \ldots,$ and $S_N$ which construct the symbols S of the codewords by arranging equation (62) to form equation (63), and calculating equation (63) is shown. As an alternative, the error correction decoding unit can extract $S_1, S_2, \ldots,$ and $S_N$ which construct the symbols S of the codewords by simplifying equation (63) into equation (65) and then calculating equation (65).

[Equation 44]

$$Nh_{1,1}S_1h_{1,1}^* + h_{1,1}^*n'_{1,1} = N(|h_{1,1}|^2)\cdot S_1 + h_{1,1}^*n'_{1,1}, \quad (65)$$
$$Nh_{2,2}S_2h_{2,2}^* + h_{2,2}^*n'_{2,2} = N(|h_{2,2}|^2)\cdot S_2 + h_{2,2}^*n'_{2,2},$$
$$\vdots$$

In above-mentioned Embodiments 1 to 5, the method of deforming the modulated waves of the codewords in the case of using HARQ-CC is shown. The same deformation can be carried out for one-time transmission when, for example, it can be presumed beforehand that a large interference wave occurs.

For example, according to equation (24) shown in Embodiment 1, three transmissions including two retransmissions are carried out in total. Instead of carrying out the three transmissions, a one-time transmission of the three symbols can be carried out.

More specifically, the three symbols which are currently transmitted in three steps according to the above equation can be transmitted at one time as follows.

$$S = \begin{bmatrix} S_1 & S_1 & S_1 \\ S_2 & e^{-j2\pi\frac{1}{3}}\cdot S_2 & e^{-j2\pi\frac{2}{3}}\cdot S_2 \\ S_3 & e^{-j2\pi\frac{2}{3}}\cdot S_3 & e^{-j2\pi\frac{1}{3}}\cdot S_3 \end{bmatrix}, \quad \text{[Equation 45]}$$

instead of $$S^{(1)} = \begin{bmatrix} S_1 \\ S_2 \\ S_3 \end{bmatrix}, S^{(2)} = \begin{bmatrix} S_1 \\ e^{-j2\pi\frac{1}{3}}\cdot S_2 \\ e^{-j2\pi\frac{2}{3}}\cdot S_3 \end{bmatrix}, S^{(3)} = \begin{bmatrix} S_1 \\ e^{-j2\pi\frac{2}{3}}\cdot S_2 \\ e^{-j2\pi\frac{1}{3}}\cdot S_3 \end{bmatrix} \quad (24)$$

In this case, by using this transmission symbol when the ratio of the interference wave is large, the interference wave can be easily removed through the one-time transmission.

This method can be similarly applied to each of Embodiments 2, 3, 4, and 5.

Embodiment 6

In above-mentioned Embodiments 1 to 5, the method (based on HARQ-CC) of, when the error correction decoding unit 26 of the data reception device 2 fails in the error correction decoding of the codeword, making the MIMO processing unit 15 of the data transmission device 1 deform the transmitted codeword according to the predetermined rule and transmit the deformed codeword is shown. As an alternative, the MIMO processing unit 15 of the data transmission device 1 can switch between transmission methods as follows.

More specifically, when the error correction decoding unit 26 of the data reception device 2 fails in the error correction decoding of the codeword, the MIMO processing unit 15 of the data transmission device 1 can use a method of transmitting additional parity information (a method using HARQ-IR) if the coding rate in the error correction encoding unit 11 is a high one between a first coding rate (e.g., a coding rate of about 1 to ⅔) and a second coding rate (e.g., a coding rate of about ½ to ⅕), whereas the MIMO processing unit 15 of the data transmission device 1 can use a method of deforming the transmitted codeword and transmitting the transmitted codeword according to the predetermined rule (a method using HARQ-CC) if the coding rate in the error correction encoding unit 11 is a low one lower than the above-mentioned high coding rate.

Concretely, the MIMO processing unit does as follows.

Hereafter, it is assumed that the error correction coding unit 11 of the data transmission device 1 creates a codeword $b=(b_1, b_2, \ldots, b_L)$ having a length L expressed by two elements {0, 1}.

It is also assumed that this codeword b is subjected to Mth-order QAM modulation by the modulating unit 12 of the data transmission device 1, and modulated symbols $S=(S_1, S_2, \ldots, S_{L/M})$ are created.

For example, QPSK is assumed to be 2nd-order QAM, and one modulated symbol is expressed by 2 bits in the codeword sequence, like in the case of $(b_1, b_2) \rightarrow S_1$.

Similarly, 16QAM is assumed to be a 4th (24)-order QAM, and one modulated symbol is expressed by 4 bits in the codeword sequence, like in the case of $(b_1, b_2, b_3, b_4) \rightarrow S_1$.

Conventionally, the HARQ-CC is the method of allocating the symbols of this modulated symbol sequence to three antennas in order shown by, for example, the following equation in which the rows correspond the three antennas respectively, to transmit them,

[Equation 46]

$$S = \begin{bmatrix} S_1 & S_4 & \cdots & S_{L/M-2} \\ S_2 & S_5 & \cdots & S_{L/M-1} \\ S_3 & S_6 & \cdots & S_{L/M} \end{bmatrix} \quad (66)$$

and, when the receive side fails to receive the modulated symbols during one transmission of them, retransmitting the modulated symbols in the same order.

Furthermore, assuming that in the case of using HARQ-IR, modulated symbols which are transmitted during a first-time transmission, a second-time transmission, and . . . are expressed as $S^{(1)}, S^{(2)}$, and . . . , and the modulated symbols of one codeword $b=(b_1, b_2, \ldots, b_L)$ can be transmitted during three transmissions, they are transmitted according to the following rule.

[Equation 47]

$$S^{(1)} = \begin{bmatrix} S_1 & S_4 & \cdots & S_{L/(3M)-2} \\ S_2 & S_5 & \cdots & S_{L/(3M)-1} \\ S_3 & S_6 & \cdots & S_{L/(3M)} \end{bmatrix},$$

$$S^{(2)} = \begin{bmatrix} S_{L/(3M)+1} & S_{L/(3M)+4} & \cdots & S_{2L/(3M)-2} \\ S_{L/(3M)+2} & S_{L/(3M)+5} & \cdots & S_{2L/(3M)-1} \\ S_{L/(3M)+3} & S_{L/(3M)+6} & \cdots & S_{2L/(3M)} \end{bmatrix},$$

$$S^{(3)} = \begin{bmatrix} S_{2L/(3M)+1} & S_{2L/(3M)+4} & \cdots & S_{L/M-2} \\ S_{2L/(3M)+2} & S_{2L/(3M)+5} & \cdots & S_{L/M-1} \\ S_{2L/(3M)+3} & S_{2L/(3M)+6} & \cdots & S_{L/3M} \end{bmatrix} \quad (67)$$

After this one codeword has been retransmitted a number of times, the data transmission device can switch to HARQ-CC and implement very long HARQ theoretically according to the following rule.

[Equation 48]

$$S^{(4)} = \begin{bmatrix} S_1 & S_4 & \cdots & S_{L/(3M)-2} \\ S_2 & S_5 & \cdots & S_{L/(3M)-1} \\ S_3 & S_6 & \cdots & S_{L/(3M)} \end{bmatrix},$$

$$S^{(5)} = \begin{bmatrix} S_{L/(3M)+1} & S_{L/(3M)+4} & \cdots & S_{2L/(3M)-2} \\ S_{L/(3M)+2} & S_{L/(3M)+5} & \cdots & S_{2L/(3M)-1} \\ S_{L/(3M)+3} & S_{L/(3M)+6} & \cdots & S_{2L/(3M)} \end{bmatrix},$$

$$S^{(6)} = \begin{bmatrix} S_{2L/(3M)+1} & S_{2L/(3M)+4} & \cdots & S_{L/M-2} \\ S_{2L/(3M)+2} & S_{2L/(3M)+5} & \cdots & S_{L/M-1} \\ S_{2L/(3M)+3} & S_{2L/(3M)+6} & \cdots & S_{L/3M} \end{bmatrix},$$

$$S^{(7)} = \begin{bmatrix} S_1 & S_4 & \cdots & S_{L/(3M)-2} \\ S_2 & S_5 & \cdots & S_{L/(3M)-1} \\ S_3 & S_6 & \cdots & S_{L/(3M)} \end{bmatrix}, \ldots \quad (68)$$

During these transmissions of modulated symbols, there occur situations in which the same combination of some symbols are transmitted repeatedly via the same antennas, as shown in, for example, the following equation, in the case of using simple HARQ-CC and also in the case of using (HARQ-IR+HARQ-CC).

$$\begin{bmatrix} S_1 \\ S_2 \\ S_3 \end{bmatrix} \quad \text{[Equation 49]}$$

In above-mentioned Embodiments 1 to 6, the example in which no special process is performed on the channel matrix H is shown, though there is a case in which a weight matrix W on which a spatial filtering process (according to a Zero Forcing algorithm or an MMSE (minimum mean squared error) algorithm) is used in order to further improve the data separation performance of each antenna. Even if this weight matrix W is multiplied by the channel matrix H and the channel matrix H in accordance with above-mentioned Embodiments 1 to 6 is replaced by WTH (T is a transposed matrix), and the processing is then carried out, the same advantages are provided.

INDUSTRIAL APPLICABILITY

As mentioned above, when the error correction decoding means of the data reception device fails to carry out the error correction decoding of codewords, the codeword transmitting means of the data transmission device deforms the transmitted codewords according to a predetermined rule, and transmits the deformed codewords, and the error correction decoding means of the data reception device reproduces the data by using the deformed codewords. As a result, the data transmission device, the data reception device, and the wireless communications system in accordance with the present invention can reduce not only the noise but the interference wave components, and improve the success rates of the demodulation and error correction decoding greatly. Therefore, the data transmission device, the data reception device, and the wireless communications system in accordance with the present invention are suitable for use as a data transmission device that transmits a plurality of codewords simultaneously by using a plurality of antennas, a data reception device that receives a plurality of codewords simultaneously by using a plurality of antennas, and a wireless communications system consisting of the data transmission device and the data reception device respectively.

The invention claimed is:

1. A data transmission device comprising:
an error correction encoding unit for carrying out error correction encoding of data which is a transmission object to create a codeword;
a modulation unit for modulating the codeword created by said error correction encoding means; and
a codeword transmitting unit for dividing the codeword modulated by said modulation unit into a plurality of codewords, and for simultaneously transmitting the plurality of codewords into which the codeword is divided by using a plurality of antennas, wherein
when a data reception device fails in error correction decoding of the codewords, said codeword transmitting unit deforms the transmitted codewords according to a predetermined rule and transmits said deformed codewords, and
when the data reception device fails in the error correction decoding of the codewords, said codeword transmitting unit transmits additional parity information if a coding rate in the error correction encoding unit is the higher of a first coding rate and a second coding rate, or deforms the transmitted codewords according to the predetermined rule and transmits said deformed codewords if the coding rate in the error correction encoding unit is the lower of said first coding rate and said second coding rate.

2. The data transmission device according to claim 1, wherein
when the data reception device fails in the error correction decoding of the codewords, the codeword transmitting unit deforms the transmitted codewords by using an orthogonal sequence.

3. A data reception device comprising:
a codeword receiving unit for receiving a plurality of codewords simultaneously transmitted from a data transmission device by using a plurality of antennas;
a demodulating unit for unifying the plurality of codewords received by said codeword receiving unit into a codeword, and for demodulating to the codeword into which the plurality of codewords are unified; and
an error correction decoding unit for carrying out error correction decoding of the codeword demodulated by said demodulating unit to reproduce data, wherein
when said error correction decoding unit fails in the error correction decoding of the codeword, and the transmitted codewords are deformed according to a predetermined rule and the deformed codewords are transmitted to the data reception device by said data transmission device, said error correction decoding unit reproduces the data by using the deformed codewords, and
when the error correction decoding unit fails in the error correction decoding of the codeword, the codeword receiving unit receives the deformed codewords from the data transmission device by using an orthogonal sequence.

4. A wireless communications system comprising:
a data transmission device comprising:
an error correction encoding unit for carrying out error correction encoding of data which is a transmission object to create a codeword,
a modulation unit for modulating the codeword created by said error correction encoding unit, and
a codeword transmitting unit for dividing the codeword modulated by said modulation unit into a plurality of codewords, and for simultaneously transmitting the plurality of codewords into which the codeword is divided by using a plurality of antennas; and
a data reception device comprising:
a codeword receiving unit for receiving the plurality of codewords simultaneously transmitted from said data transmission device by using a plurality of antennas,
a demodulating unit for unifying the plurality of codewords received by said codeword receiving unit into a codeword, and for demodulating the codeword into which the plurality of codewords are unified, and
an error correction decoding unit for carrying out error correction decoding of the codeword demodulated by said demodulating unit to reproduce data, wherein
when the error correction decoding unit of said data reception device fails in the error correction decoding of the codeword, the codeword transmitting unit of said data transmission device deforms the transmitted codewords according to a predetermined rule, and transmits the deformed codewords, and the error correction decoding unit of said data reception device reproduces the data by using the deformed codewords, and
when the error correction decoding unit of the data reception device fails in the error correction decoding of the codeword, the codeword transmitting unit of the data transmission device transmits additional parity information if a coding rate in the error correction encoding unit is the higher of a first coding rate and a second coding rate, or deforms the transmitted codewords according to a predetermined rule and transmits said codewords if the coding rate in the error correction encoding unit is the lower of said first coding rate and said second coding rate.

5. The wireless communications system according to claim 4, wherein
when the error correction decoding unit of the data reception device fails in the error correction decoding of the codeword, the codeword transmitting unit of the data transmission device deforms the transmitted codewords by using an orthogonal sequence.

6. The wireless communications system according to claim 5, wherein
in a case in which the codewords are transmitted via N communication channels and interference occurs among the N communication channels, assuming a channel matrix H and expressing symbols of the codewords transmitted from the codeword transmitting unit of the data transmission device and symbols of the codewords received by the codeword receiving unit of the data reception device as S and r respectively, when the error correction decoding unit of the data reception device fails in the error correction decoding of the codeword, and the codeword transmitting unit of said data transmission device then deforms said symbols S of the codewords and transmits a sequence $S^{(1:N)}$ of symbols $S^{(j)}$, the codeword receiving unit of said data reception device receives a sequence $r^{(1:N)}$, and the error correction decoding unit of said data reception device extracts $S_1, S_2, ..., $ and $S_N$ which construct the symbols S of the codewords from said sequence $r^{(1:N)}$, such that the following equations are satisfied:

[Equation 1]

$$H = \begin{bmatrix} h_{1,1} & h_{1,2} & \cdots & \cdots & h_{1,N} \\ h_{2,1} & \ddots & \ddots & \ddots & \vdots \\ \vdots & \ddots & h_{i,j} & \ddots & \vdots \\ \vdots & \ddots & \ddots & \ddots & \vdots \\ h_{N,1} & \cdots & \cdots & \cdots & h_{N,N} \end{bmatrix} \quad (1)$$

where $h_{i,j}$ is a communication channel response from j-th transmitting antenna to i-th receiving antenna $$S \begin{bmatrix} S_1 \\ S_2 \\ \vdots \\ S_N \end{bmatrix} \quad (2)$$

$$r = HS + n = \begin{bmatrix} h_{1,1} & h_{1,2} & \cdots & \cdots & h_{1,N} \\ h_{2,1} & \ddots & \ddots & \ddots & \vdots \\ \vdots & \ddots & h_{i,j} & \ddots & \vdots \\ \vdots & \ddots & \ddots & \ddots & \vdots \\ h_{N,1} & \cdots & \cdots & \cdots & h_{N,N} \end{bmatrix} \begin{bmatrix} S_1 \\ S_2 \\ \vdots \\ S_N \end{bmatrix} + \begin{bmatrix} n_1 \\ n_2 \\ \vdots \\ n_N \end{bmatrix} = \begin{bmatrix} h_{1,1}S_1 + h_{1,2}S_2 + \ldots + h_{1,N}S_N \\ h_{2,1}S_1 + h_{2,2}S_2 + \ldots + h_{2,N}S_N \\ \vdots \\ h_{N,1}S_1 + h_{N,2}S_2 + \ldots + h_{N,N}S_N \end{bmatrix} + \begin{bmatrix} n_1 \\ n_2 \\ \vdots \\ n_N \end{bmatrix} \quad (3)$$

$$S^{(1:N)} = [S^{(1)} \ S^{(2)} \ \cdots \ S^{(N)}] = \begin{bmatrix} \alpha^0 S_1 & \alpha^0 S_1 & \alpha^0 S_1 & \cdots & \alpha^0 S_1 & \alpha^0 S_1 \\ \alpha^0 S_2 & \alpha^1 S_2 & \alpha^2 S_2 & \cdots & \alpha^{N-2} S_2 & \alpha^{N-1} S_2 \\ \alpha^0 S_3 & \alpha^2 S_3 & \alpha^3 S_3 & \cdots & \alpha^{N-1} S_3 & \alpha^1 S_3 \\ \vdots & \vdots & \vdots & \ddots & \vdots & \vdots \\ \alpha^0 S_{N-1} & \alpha^{N-2} S_{N-1} & \alpha^{N-1} S_{N-1} & \cdots & \alpha^{N-4} S_{N-1} & \alpha^{N-3} S_{N-1} \\ \alpha^0 S_N & \alpha^{N-1} S_N & \alpha^1 S_N & \cdots & \alpha^{N-3} S_N & \alpha^{N-2} S_N \end{bmatrix}, \quad (4)$$

[Equation 2]

$$\alpha^i = \exp(-j2\pi \cdot i/N) \quad (5)$$

$$r^{(1:N)} = HS^{(1:N)} + n^{(1:N)} = \begin{bmatrix} h_{1,1}\alpha^0 S_1 + h_{1,2}\alpha^0 S_2 + \ldots + h_{1,N}\alpha^0 S_N & \cdots & \cdots & h_{1,1}\alpha^0 S_1 + h_{1,2}\alpha^{N-1}S_2 + h_{1,3}\alpha^{N-1}S_2 + \ldots + h_{1,N-1}\alpha^{N-3}S_{N-1} + h_{1,N}\alpha^{N-2}S_N \\ h_{2,1}\alpha^0 S_1 + h_{2,2}\alpha^0 S_2 + \ldots + h_{2,N}\alpha^0 S_N & \cdots & \cdots & h_{2,1}\alpha^0 S_1 + h_{2,2}\alpha^{N-1}S_2 + h_{2,3}\alpha^{N-1}S_2 + \ldots + h_{2,N-1}\alpha^{N-3}S_{N-1} + h_{2,N}\alpha^{N-2}S_N \\ \vdots & \vdots & \vdots & \vdots \\ h_{N,1}\alpha^0 S_1 + h_{N,2}\alpha^0 S_2 + \ldots + h_{N,N}\alpha^0 S_N & \cdots & \cdots & h_{N,1}\alpha^0 S_1 + h_{N,2}\alpha^{N-1}S_2 + h_{N,3}\alpha^{N-1}S_2 + \ldots + h_{N,N-1}\alpha^{N-3}S_{N-1} + h_{N,N}\alpha^{N-2}S_N \end{bmatrix} + \begin{bmatrix} n_1^{(1)} & n_1^{(2)} & \cdots & n_1^{(N)} \\ n_2^{(1)} & n_2^{(2)} & \cdots & n_2^{(N)} \\ \vdots & \vdots & \ddots & \vdots \\ n_N^{(1)} & n_N^{(2)} & \cdots & n_N^{(N)} \end{bmatrix}$$

$$r^{(1:N)} \begin{bmatrix} \alpha^0 & \alpha^0 & \alpha^0 & \cdots & \alpha^0 & \alpha^0 \\ \alpha^0 & \alpha^{-1} & \alpha^{-2} & \cdots & \alpha^{-(N-2)} & \alpha^{-(N-1)} \\ \alpha^0 & \alpha^{-2} & \alpha^{-3} & \cdots & \alpha^{-(N-1)} & \alpha^{-1} \\ \vdots & \vdots & \vdots & \ddots & \vdots & \vdots \\ \alpha^0 & \alpha^{-(N-2)} & \alpha^{-(N-1)} & \cdots & \alpha^{-(N-4)} & \alpha^{-(N-3)} \\ \alpha^0 & \alpha^{-(N-1)} & \alpha^{-1} & \cdots & \alpha^{-(N-3)} & \alpha^{-(N-2)} \end{bmatrix} = N \begin{bmatrix} h_{1,1}S_1 & h_{1,2}S_1 & \cdots & h_{1,N}S_1 \\ h_{2,1}S_2 & h_{2,2}S_2 & \cdots & h_{2,N}S_2 \\ \vdots & \vdots & & \vdots \\ h_{N,1}S_N & h_{N,2}S_N & \cdots & h_{N,N}S_N \end{bmatrix} + \begin{bmatrix} \alpha^0 n_1^{(1)} + \alpha^0 n_1^{(2)} + \ldots + \alpha^0 n_1^{(N)} & \alpha^0 n_1^{(1)} + \alpha^{-1}n_1^{(2)} + \ldots + \alpha^{-(N-1)}n_1^{(N)} & \cdots & \alpha^0 n_1^{(1)} + \alpha^{-(N-1)}n_1^{(2)} + \ldots + \alpha^{-(N-2)}n_1^{(N)} \\ \alpha^0 n_2^{(1)} + \alpha^0 n_2^{(2)} + \ldots + \alpha^0 n_2^{(N)} & \alpha^0 n_2^{(1)} + \alpha^{-1}n_2^{(2)} + \ldots + \alpha^{-(N-1)}n_2^{(N)} & \cdots & \alpha^0 n_2^{(1)} + \alpha^{-(N-1)}n_2^{(2)} + \ldots + \alpha^{-(N-2)}n_2^{(N)} \\ \vdots & \vdots & \ddots & \vdots \\ \alpha^0 n_N^{(1)} + \alpha^0 n_N^{(2)} + \ldots + \alpha^0 n_N^{(N)} & \alpha^0 n_N^{(1)} + \alpha^{-1}n_N^{(2)} + \ldots + \alpha^{-(N-1)}n_N^{(N)} & \cdots & \alpha^0 n_N^{(1)} + \alpha^{-(N-1)}n_N^{(2)} + \ldots + \alpha^{-(N-2)}n_N^{(N)} \end{bmatrix} \quad (6)$$

[Equation 3]

$$Nh_{1,1}S_1 h_{1,1}^* + Nh_{1,2}S_1 h_{1,2}^* + \ldots + n_1' = N(|h_{1,1}|^2 + |h_{1,2}|^2 + \ldots) \cdot S_1 + n_1',$$
$$Nh_{2,1}S_2 h_{2,1}^* + Nh_{2,2}S_2 h_{2,2}^* + \ldots + n_2' = N(|h_{2,1}|^2 + |h_{2,2}|^2 + \ldots) \cdot S_2 + n_2', \ldots \quad (7)$$
$$\vdots$$

where a* is a complex conjugate number of a, and $n'_1$, $n'_2, \ldots, n'_N$ are expressed as follows:

$$\begin{bmatrix} n'_{1,1} & n'_{1,2} & \cdots & n'_{1,N} \\ n'_{2,1} & n'_{2,2} & \cdots & n'_{2,N} \\ \vdots & \vdots & \ddots & \vdots \\ n'_{N,1} & n'_{N,2} & \cdots & n'_{N,N} \end{bmatrix} = \begin{bmatrix} \alpha^0 n_1^{(1)} + \alpha^0 n_1^{(2)} + \ldots + \alpha^0 n_1^{(N)} & \alpha^0 n_1^{(1)} + \alpha^{-1} n_1^{(2)} + \ldots + \alpha^{-(N-1)} n_1^{(N)} & \cdots & \alpha^0 n_1^{(1)} + \alpha^{-(N-1)} n_1^{(2)} + \ldots + \alpha^{-(N-2)} n_1^{(N)} \\ \alpha^0 n_2^{(1)} + \alpha^0 n_2^{(2)} + \ldots + \alpha^0 n_2^{(N)} & \alpha^0 n_2^{(1)} + \alpha^{-1} n_2^{(2)} + \ldots + \alpha^{-(N-1)} n_2^{(N)} & \cdots & \alpha^0 n_2^{(1)} + \alpha^{-(N-1)} n_2^{(2)} + \ldots + \alpha^{-(N-2)} n_2^{(N)} \\ \vdots & \vdots & \ddots & \vdots \\ \alpha^0 n_N^{(1)} + \alpha^0 n_N^{(2)} + \ldots + \alpha^0 n_N^{(N)} & \alpha^0 n_N^{(1)} + \alpha^{-1} n_N^{(2)} + \ldots + \alpha^{-(N-1)} n_N^{(N)} & \cdots & \alpha^0 n_N^{(1)} + \alpha^{-(N-1)} n_N^{(2)} + \ldots + \alpha^{-(N-2)} n_N^{(N)} \end{bmatrix} \quad (8)$$

$$n'_1 = h^*_{1,1} n'_{1,1} + h^*_{2,1} n'_{2,1} + \ldots + h^*_{N,1} n'_{N,1}, \quad (9)$$
$$n'_2 = h^*_{1,2} n'_{1,2} + h^*_{2,2} n'_{2,2} + \ldots + h^*_{N,2} n'_{N,2},$$
$$\vdots$$

7. The wireless communications system according to claim 6, wherein
the error correction decoding unit of the data reception device extracts $S_1, S_2, \ldots,$ and $S_N$ which construct the symbols S of the codewords according to a following equation (10) which is a simplification of an equation (7):

[Equation 4]

$$Nh_{1,1} S_1 h^*_{1,1} + h^*_{1,1} n'_{1,1} = N(|h_{1,1}|^2) \cdot S_1 + h^*_{1,1} n'_{1,1}, \quad (10)$$
$$Nh_{2,2} S_2 h^*_{2,2} + h^*_{2,2} n'_{2,2} = N(|h_{2,2}|^2) \cdot S_2 + h^*_{2,2} n'_{2,2},$$
$$\vdots$$

8. The wireless communications system according to claim 5, wherein
in a case in which the codewords are transmitted via N communication channels (N is a power of two) and interference occurs among the N communication channels, assuming a channel matrix H and expressing symbols of the codewords transmitted from the codeword transmitting unit of the data transmission device and symbols of the codewords received by the codeword receiving unit of the data reception device as S and r respectively, when the error correction decoding unit of the data reception device fails in the error correction decoding of the codeword, and the codeword transmitting unit of said data transmission device then deforms said symbols S of the codewords and transmits a sequence $S(^{1:N})$ of symbols $S_{(j)}$, the codeword receiving unit of said data reception device receives a sequence $r(^{1:N})$, and the error correction decoding unit of said data reception device extracts $S_1, S_2, \ldots,$ and $S_N$ which construct the symbols S of the codewords from said sequence $r(^{1:N})$, such that the following equations are satisfied:

[Equation 5]

$$H = \begin{bmatrix} h_{1,1} & h_{1,2} & \cdots & \cdots & h_{1,N} \\ h_{2,1} & \ddots & \ddots & \ddots & \vdots \\ \vdots & \ddots & h_{i,j} & \ddots & \vdots \\ \vdots & \ddots & \ddots & \ddots & \vdots \\ h_{N,1} & \cdots & \cdots & \cdots & h_{N,N} \end{bmatrix} \quad (11)$$

where $h_{i,j}$ is a communication channel response from j-th transmitting antenna to i-th receiving antenna.

$$S = \begin{bmatrix} S_1 \\ S_2 \\ \vdots \\ S_N \end{bmatrix} \quad (12)$$

$$r = HS + n = \begin{bmatrix} h_{1,1} & h_{1,2} & \cdots & \cdots & h_{1,N} \\ h_{2,1} & \ddots & \ddots & \ddots & \vdots \\ \vdots & \ddots & h_{i,j} & \ddots & \vdots \\ \vdots & \ddots & \ddots & \ddots & \vdots \\ h_{N,1} & \cdots & \cdots & \cdots & h_{N,N} \end{bmatrix} \begin{bmatrix} S_1 \\ S_2 \\ \vdots \\ S_N \end{bmatrix} + \begin{bmatrix} n_1 \\ n_2 \\ \vdots \\ n_N \end{bmatrix} = \begin{bmatrix} h_{1,1} S_1 + h_{1,2} S_2 + \ldots + h_{1,N} S_N \\ h_{2,1} S_1 + h_{2,2} S_2 + \ldots + h_{2,N} S_N \\ \vdots \\ h_{N,1} S_1 + h_{N,2} S_2 + \ldots + h_{N,N} S_N \end{bmatrix} + \begin{bmatrix} n_1 \\ n_2 \\ \vdots \\ n_N \end{bmatrix} \quad (13)$$

[Equation 6]

$$S^{(1:N)} = [S^{(1)} \ S^{(2)} \ \cdots \ S^{(N)}] = \begin{bmatrix} \gamma_{1,1} S_1 & \gamma_{1,2} S_1 & \cdots & \gamma_{1,N} S_1 \\ \gamma_{2,1} S_2 & \gamma_{2,2} S_2 & \cdots & \gamma_{2,N} S_2 \\ \vdots & \vdots & \ddots & \vdots \\ \gamma_{N,1} S_N & \gamma_{N,2} S_N & \cdots & \gamma_{N,N} S_N \end{bmatrix}, \quad (14)$$

where $y_{i,j}$ is a component of an Hadamard matrix (a component of an orthogonal code), and, in a case of N=4, is expressed as follows:

$$\begin{bmatrix} \gamma_{1,1} & \gamma_{1,2} & \gamma_{1,3} & \gamma_{1,4} \\ \gamma_{2,1} & \gamma_{2,2} & \gamma_{2,3} & \gamma_{2,4} \\ \gamma_{3,1} & \gamma_{3,1} & \gamma_{3,3} & \gamma_{3,4} \\ \gamma_{4,1} & \gamma_{4,2} & \gamma_{4,3} & \gamma_{4,4} \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (15)$$

$$r^{(1:N)} = HS^{(1:N)} + n^{(1,2,3,4)}$$

$$r^{(1:N)} \begin{bmatrix} \gamma_{1,1} & \gamma_{1,2} & \cdots & \gamma_{1,N} \\ \gamma_{2,1} & \gamma_{2,2} & \cdots & \gamma_{2,N} \\ \vdots & \vdots & \ddots & \vdots \\ \gamma_{N,1} & \gamma_{N,2} & \cdots & \gamma_{N,N} \end{bmatrix} = N \begin{bmatrix} h_{1,1}S_1 & h_{1,2}S_1 & \cdots & h_{1,N}S_1 \\ h_{2,1}S_2 & h_{2,2}S_2 & \cdots & h_{2,N}S_2 \\ \vdots & \vdots & \vdots & \vdots \\ h_{N,1}S_N & h_{N,2}S_N & \cdots & h_{N,N}S_N \end{bmatrix} + \quad (16)$$

$$\begin{bmatrix} \gamma_{1,1}n_1^{(1)} + \gamma_{2,1}n_1^{(2)} + \ldots + \gamma_{N,1}n_1^{(N)} & \gamma_{1,2}n_1^{(1)} + \gamma_{2,2}n_1^{(2)} + \ldots + \gamma_{N,2}n_1^{(N)} & \cdots & \gamma_{1,N}n_1^{(1)} + \gamma_{2,N}n_1^{(2)} + \ldots + \gamma_{N,N}n_1^{(N)} \\ \gamma_{1,1}n_2^{(1)} + \gamma_{2,1}n_2^{(2)} + \ldots + \gamma_{N,1}n_2^{(N)} & \gamma_{1,2}n_2^{(1)} + \gamma_{2,2}n_2^{(2)} + \ldots + \gamma_{N,2}n_2^{(N)} & \cdots & \gamma_{1,N}n_2^{(1)} + \gamma_{2,N}n_2^{(2)} + \ldots + \gamma_{N,N}n_2^{(N)} \\ \vdots & \vdots & \ddots & \vdots \\ \gamma_{1,1}n_N^{(1)} + \gamma_{2,1}n_N^{(2)} + \ldots + \gamma_{N,1}n_N^{(N)} & \gamma_{1,2}n_N^{(1)} + \gamma_{2,2}n_N^{(2)} + \ldots + \gamma_{N,2}n_N^{(N)} & \cdots & \gamma_{1,N}n_N^{(1)} + \gamma_{2,N}n_N^{(2)} + \ldots + \gamma_{N,N}n_N^{(N)} \end{bmatrix}$$

[Equation 7]

$$Nh_{1,1}S_1h_{1,1}^* + Nh_{1,2}S_1h_{1,2}^* + \ldots + n_1' = N(|h_{1,1}|^2 + |h_{1,2}|^2 + \ldots) \cdot S_1 + n_1', \quad (17)$$
$$Nh_{2,1}S_2h_{2,1}^* + Nh_{2,2}S_2h_{2,2}^* + \ldots + n_2' = N(|h_{2,1}|^2 + |h_{2,2}|^2 + \ldots) \cdot S_2 + n_2', \ldots$$
$$\vdots$$

where $n'_1, n'_2, \ldots, n'_N$ are expressed as follows:

$$\begin{bmatrix} n'_{1,1} & n'_{1,2} & \cdots & n'_{1,N} \\ n'_{2,1} & n'_{2,2} & \cdots & n'_{2,N} \\ \vdots & \vdots & \ddots & \vdots \\ n'_{N,1} & n'_{N,2} & \cdots & n'_{N,N} \end{bmatrix} = \quad (18)$$

$$\begin{bmatrix} \gamma_{1,1}n_1^{(1)} + \gamma_{2,1}n_1^{(2)} + \ldots + \gamma_{N,1}n_1^{(N)} & \gamma_{1,2}n_1^{(1)} + \gamma_{2,2}n_1^{(2)} + \ldots + \gamma_{N,2}n_1^{(N)} & \cdots & \gamma_{1,N}n_1^{(1)} + \gamma_{2,N}n_1^{(2)} + \ldots + \gamma_{N,N}n_1^{(N)} \\ \gamma_{1,1}n_2^{(1)} + \gamma_{2,1}n_2^{(2)} + \ldots + \gamma_{N,1}n_2^{(N)} & \gamma_{1,2}n_2^{(1)} + \gamma_{2,2}n_2^{(2)} + \ldots + \gamma_{N,2}n_2^{(N)} & \cdots & \gamma_{1,N}n_2^{(1)} + \gamma_{2,N}n_2^{(2)} + \ldots + \gamma_{N,N}n_2^{(N)} \\ \vdots & \vdots & \ddots & \vdots \\ \gamma_{1,1}n_N^{(1)} + \gamma_{2,1}n_N^{(2)} + \ldots + \gamma_{N,1}n_N^{(N)} & \gamma_{1,2}n_N^{(1)} + \gamma_{2,2}n_N^{(2)} + \ldots + \gamma_{N,2}n_N^{(N)} & \cdots & \gamma_{1,N}n_N^{(1)} + \gamma_{2,N}n_N^{(2)} + \ldots + \gamma_{N,N}n_N^{(N)} \end{bmatrix}$$

$$n'_1 = h_{1,1}^* n'_{1,1} + h_{2,1}^* n'_{2,1} + \ldots + h_{N,1}^* n'_{N,1}, \quad (19)$$
$$n'_2 = h_{1,2}^* n'_{1,2} + h_{2,2}^* n'_{2,2} + \ldots + h_{N,2}^* n'_{N,2},$$
$$\vdots$$

9. The wireless communications system according to claim 8, wherein
the error correction decoding unit of the data reception device extracts $S_1$, $S_2$, ..., and $S_N$ which construct the symbols S of the codewords according to a following equation (20) which is a simplification of an equation (17):

[Equation 8]

$$Nh_{1,1}S_1h_{1,1}^* + h_{1,1}^* n'_{1,1} = N(|h_{1,1}|^2) \cdot S_1 + h_{1,1}^* n'_{1,1}, \quad (20)$$
$$Nh_{2,2}S_2h_{2,2}^* + h_{2,2}^* n'_{2,2} = N(|h_{2,2}|^2) \cdot S_2 + h_{2,2}^* n'_{2,2},$$
$$\vdots$$

10. The wireless communications system according to claim 4, wherein
in a case in which it is estimated beforehand that an interference wave is large, when simultaneously transmitting the plurality of divided codewords by using the plurality of antennas, the codeword transmitting unit of the data transmission device deforms said codewords according to the predetermined rule and transmits the deformed codewords together.

11. The data transmission device according to claim 1, wherein the transmitted codewords are deformed in such manner that changes bit values in each transmitted codeword.

12. The data reception device according to claim 3, wherein the transmitted codewords are deformed in such manner that changes bit values in each transmitted codeword.

13. The wireless communication system according to claim 4, wherein the transmitted codewords are deformed in such manner that changes bit values in each transmitted codeword.

* * * * *